(12) United States Patent
Doerr

(10) Patent No.: US 12,184,333 B2
(45) Date of Patent: Dec. 31, 2024

(54) OPTICAL MULTIPLE-INPUT-MULTIPLE-OUTPUT (MIMO) DEMULTIPLEXERS

(71) Applicant: Aloe Semiconductor Inc., Irvine, CA (US)

(72) Inventor: Christopher R. Doerr, Irvine, CA (US)

(73) Assignee: Aloe Semiconductor Inc., Middletown, NJ (US)

( * ) Notice: Subject to any disclaimer, the term of this patent is extended or adjusted under 35 U.S.C. 154(b) by 0 days.

(21) Appl. No.: 17/485,215

(22) Filed: Sep. 24, 2021

(65) Prior Publication Data

US 2023/0097053 A1    Mar. 30, 2023

(51) Int. Cl.
*H04B 10/556* (2013.01)
*H04B 10/50* (2013.01)
*H04B 10/61* (2013.01)

(52) U.S. Cl.
CPC ....... *H04B 10/5053* (2013.01); *H04B 10/556* (2013.01); *H04B 10/614* (2013.01); *H04B 10/6166* (2013.01)

(58) Field of Classification Search
CPC .......... H04B 10/5053; H04B 10/556; H04B 10/614; H04B 10/6166
USPC .......................................................... 398/17
See application file for complete search history.

(56) References Cited

U.S. PATENT DOCUMENTS

| | | |
|---|---|---|
| 10,788,679 B2 | 9/2020 | Baehr-Jones et al. |
| 11,050,505 B1 | 6/2021 | Jones et al. |
| 11,245,473 B2 | 2/2022 | Morsy-Osman et al. |
| 2010/0296152 A1 | 11/2010 | Shiraishi |

(Continued)

FOREIGN PATENT DOCUMENTS

| | | | | |
|---|---|---|---|---|
| JP | 2005 309447 A | * | 4/2005 | ......... H04B 10/5053 |
| JP | 2011064657 | | 3/2011 | |

(Continued)

OTHER PUBLICATIONS

Nicolas K. Fontaine et al. ("PDM-DQPSK Silicon Receiver With Integrated Monitor and Minimum Number of Controls", IEEE Photonics Technology Letters, vol. 24, No. 8 , Apr. 15, 2012). (Year: 2012).*

(Continued)

*Primary Examiner* — Mohammad R Sedighian
(74) *Attorney, Agent, or Firm* — Fish & Richardson P.C.

(57) ABSTRACT

A 2×2 optical multi-input-multi-output (MIMO) demultiplexer is disclosed. A first optical phase shifter applies a first relative phase shift between a first pair of optical transmission paths that are received from MIMO inputs, and a first 2×2 optical coupler combines the first pair of optical transmission paths and outputs a second pair of optical transmission paths. A second optical phase shifter applies a second relative phase shift between the second pair of optical transmission paths, and a second 2×2 optical coupler combines the second pair of optical transmission paths and outputs a third pair of optical transmission paths. A third optical phase shifter applies a third relative phase shift between the third pair of optical transmission paths, and a third 2×2 optical coupler combines the third pair of optical transmission paths and outputs a fourth pair of optical transmission paths, which are output by a pair of MIMO outputs.

23 Claims, 12 Drawing Sheets

(56) References Cited

U.S. PATENT DOCUMENTS

| | | | |
|---|---|---|---|
| 2015/0117872 A1 | 4/2015 | Lyubomirsky | |
| 2016/0204894 A1 | 7/2016 | Dong et al. | |
| 2019/0179163 A1 | 6/2019 | Baehr-Jones et al. | |
| 2020/0099454 A1* | 3/2020 | Talkhooncheh | G02F 1/015 |
| 2021/0234616 A1 | 7/2021 | Morsy-Osman et al. | |
| 2022/0045766 A1 | 2/2022 | Le | |
| 2023/0043960 A1 | 2/2023 | Qu et al. | |
| 2023/0396340 A1 | 12/2023 | Doerr et al. | |

FOREIGN PATENT DOCUMENTS

| | | |
|---|---|---|
| WO | WO 2016046315 | 3/2016 |
| WO | WO 2020026007 | 2/2020 |

OTHER PUBLICATIONS

Yang Jing Wen et al. (Optics Express, vol. 28, No. 15, Jul. 20, 2020) (Year: 2020).*

Christopher R. Doerr, "Proposed Architecture for MIMO Optical Demultiplexing Using Photonic Integration," IEEE Photonics Technology Letters, Nov. 1, 2011, 23(21), 3 pages.

Doerr et al., "Monolithic PDM-DQPSK receiver in silicon", 36th European Conference and Exhibition on Optical Communication, Sep. 2010, 3 pages.

Doerr et al., "PDM-DQPSK Silicon Receiver With Integrated Monitor and Minimum Number of Controls," IEEE Photonics Technology Letters, Apr. 15, 2012, 24(8), 3 pages.

Liao et al., "A 260 GB/s/λ PDM Link with Silicon Photonic Dual-Polarization Transmitter and Polarization Demultiplexer," 2021 European Conference on Optical Communication (ECOC), Sep. 2021, 4 pages.

Ma et al., "Automated control algorithms for silicon photonic polarization receiver", Optics Express, Jan. 20, 2020, 28(2), 12 pages.

Martinelli et al., "Endless Polarization Control Algorithm Using Adjustable Linear Retarders With Fixed Axes", Journal of Lightwave Technology, Sep. 2003, 21(9), 8 pages.

Martinelli et al., "Polarization Stabilization in Optical Communications Systems", Journal of Lightwave Technology, Nov. 2006, 24(11), 12 pages.

Nespola et al., "Proof of Concept of Polarization-Multiplexed PAM Using a Compact Si-Ph Device", IEEE Photonics Technology Letters, Jan. 1, 2019, 31(1), 4 pages.

Wen et al., "200G self-homodyne detection with 64QAM by endless optical polarization demultiplexing," Optics Express, Jul. 20, 2020, 28(15), 16 pages.

Noe et al., "Endless Polarization Control Systems for Coherent Optics," Journal of Lightwave Technology, Jul. 1988, 6(7), 10 pages.

Che et al., "Implementing Simplified Stokes Vector Receiver for Phase Diverse Direct Detection," 2015 Optical Fiber Communications Conference and Exhibition (OFC), Los Angeles, CA, USA, Mar. 22-26, 2015, 3 pages.

Kikuchi et al. "Multi-level signaling in the Stokes space and its application to large-capacity optical communications", Optics Express, Apr. 2014, 22(7):7374-7387.

Li et al., "Side Effect of Normal Vector Recovery based Polarization Demultiplexing in Stokes Space and the Countermeasure," 2020 European Conference on Optical Communications (ECOC), Brussels, Belgium, Dec. 6-10, 2020, 4 pages.

Morsy-Osman et al., "1λ× 224 Gb/s 10 km Transmission of Polarization Division Multiplexed PAM-4 Signals Using 1.3 μm SiP Intensity Modulator and a Direct-Detection MIMO-based Receiver," 2014 The European Conference on Optical Communication (ECOC), Cannes, France, Sep. 21-25, 2014, 3 pages.

Muga et al. "Adaptive 3-D Stokes Space-Based Polarization Demultiplexing Algorithm," Journal of Lightwave Technology, Oct. 2014, 32(19):3290-3298.

Nespola et al. "Proof of Concept of Polarization-Multiplexed PAM Using a Compact Si-Ph Device," IEEE Photonics Technology Letters, Jan. 2019, 31(1), 4 pages.

Szafraniec et al., "Polarization demultiplexing in Stokes space," Optics Express, Aug. 2010, 18(17):17928-17939.

* cited by examiner

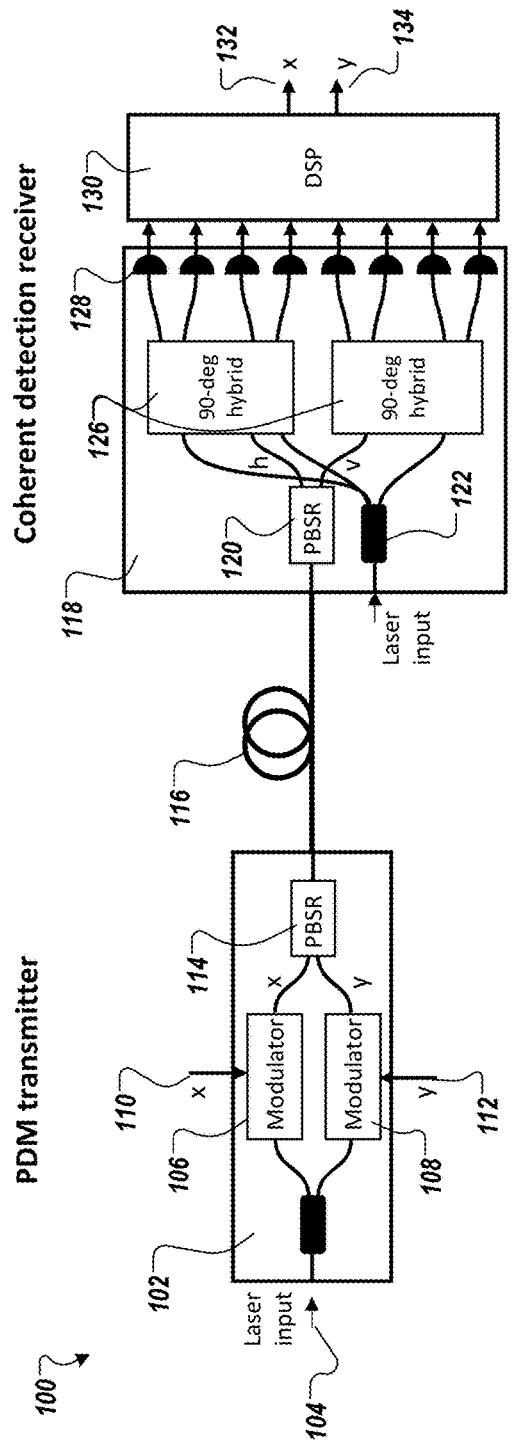
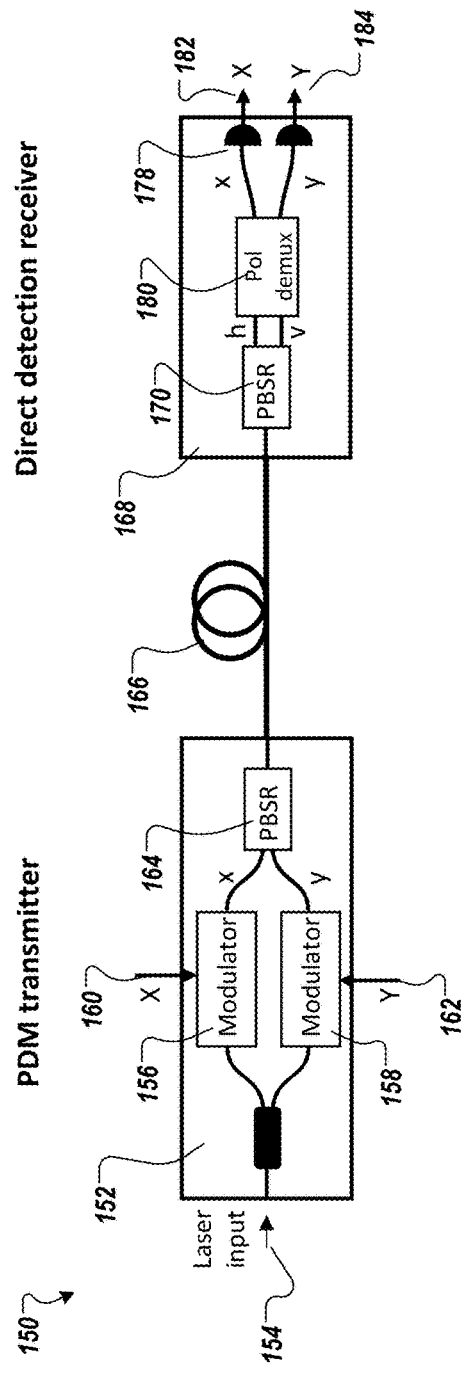

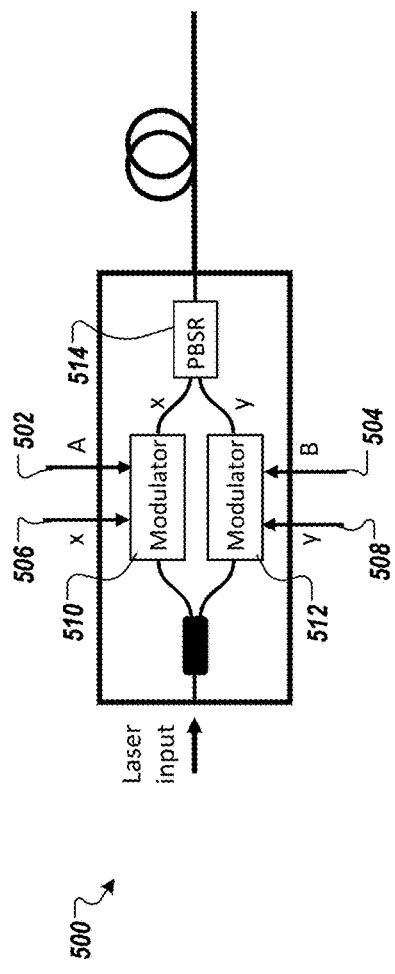
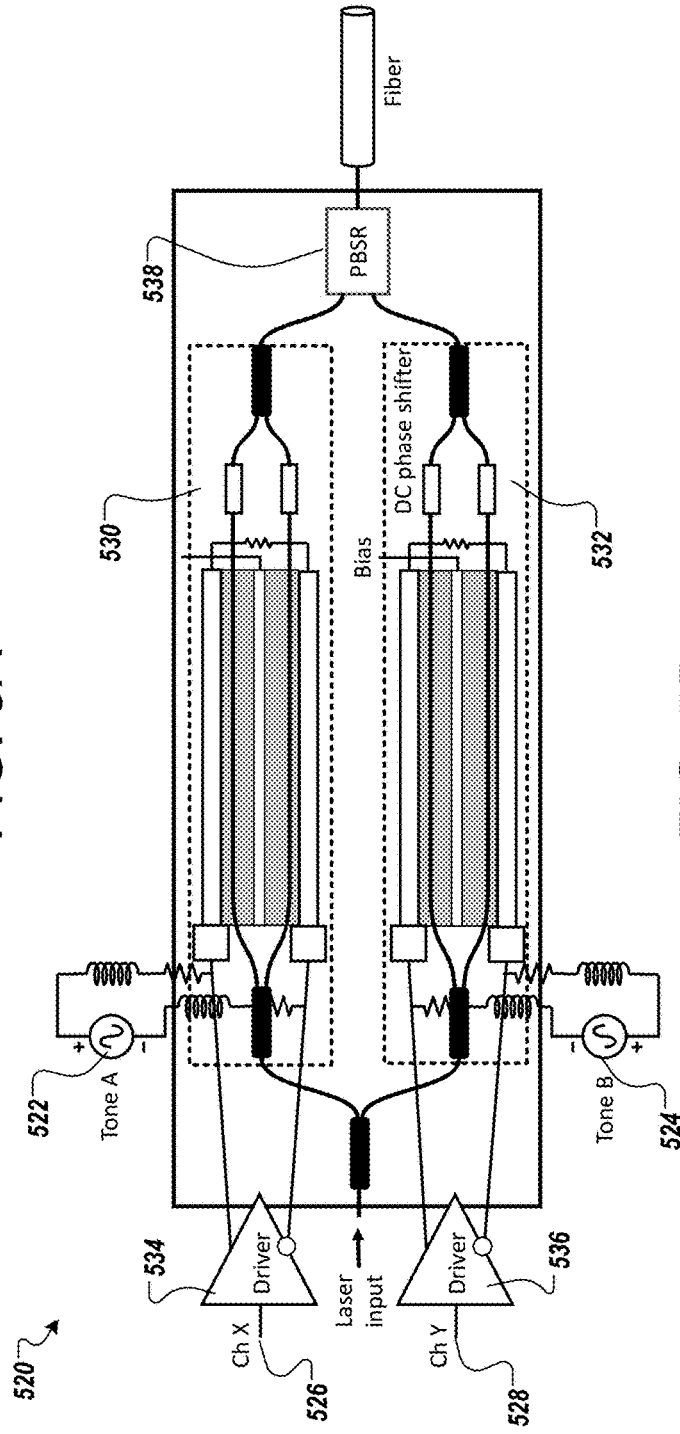
FIG. 5A
FIG. 5B

OPTICAL MULTIPLE-INPUT-MULTIPLE-OUTPUT (MIMO) DEMULTIPLEXERS

TECHNICAL FIELD

The present disclosure generally relates to optical demultiplexers.

BACKGROUND

In optical communication systems, multiplexing techniques (such as polarization-division multiplexing (PDM)) can increase communication capacity and/or photon efficiency by multiplexing different signals over different channels (e.g., different polarization modes on the same carrier frequency) for simultaneous transmission through a single fiber. However, a challenge of using PDM is that the polarization modes tend to undergo random and unpredictable rotations and losses as they propagate through an optical communication system, for example due to stress in the glass fiber (bending and twisting), ambient temperature changes, or other non-idealities in the communication system. This results in the different signals in the polarization modes becoming mixed among each other when they are received. In such scenarios, the signals must be unmixed at the receiver through multiple-input-multiple-output (MIMO) demultiplexing.

SUMMARY

Implementations of the present disclosure are generally directed to optical demultiplexers, such as optical polarization demultiplexers.

One general aspect includes a 2×2 optical multi-input-multi-output (MIMO) demultiplexer, including: a pair of MIMO inputs configured to input light into a first pair of optical transmission paths; a first optical phase shifter configured to apply a first relative phase shift between the first pair of optical transmission paths; a first 2×2 optical coupler configured to combine the first pair of optical transmission paths and output a second pair of optical transmission paths; a second optical phase shifter configured to apply a second relative phase shift between the second pair of optical transmission paths; a second 2×2 optical coupler configured to combine the second pair of optical transmission paths and output a third pair of optical transmission paths; a third optical phase shifter configured to apply a third relative phase shift between the third pair of optical transmission paths; a third 2×2 optical coupler configured to combine the third pair of optical transmission paths and output a fourth pair of optical transmission paths; and a pair of MIMO outputs configured to output the fourth pair of optical transmission paths. Other embodiments of this aspect include corresponding computer systems, apparatus, and computer programs recorded on one or more computer storage devices, each configured to perform the actions of the methods.

Implementations may include one or more of the following features. The 2×2 optical MIMO demultiplexer where the first optical phase shifter is configured to apply a value of the first relative phase shift that is binary. The 2×2 optical MIMO demultiplexer where the value of the first relative phase shift is binary among $c+\pi/2$ and $c\times\pi/2$, where c is a real number. The 2×2 optical MIMO demultiplexer where the second optical phase shifter is configured to apply a value of the second relative phase shift within a finite range that includes $-n\pi$ and $+n\pi$, where n is an integer. The 2×2 optical MIMO demultiplexer where the second optical phase shifter is configured for analog operation within a range $(-n\pi, +n\pi)$. The 2×2 optical MIMO demultiplexer where the third optical phase shifter is configured to apply a value of the third relative phase shift within a finite range that depends on the value of the first relative phase shift. The 2×2 optical MIMO demultiplexer where the third optical phase shifter is configured to operate between 0 and $+n\pi$, based on the value of the first relative phase shift being $c-\pi/2$, and is configured to operate between $-n\pi$ and 0, based on the value of the first relative phase shift being $c+\pi/2$, where n is an integer. The 2×2 optical MIMO demultiplexer where the third optical phase shifter is configured for analog operation within a range $(0, +n\pi)$ or within a range $(-n\pi, 0)$. The 2×2 optical MIMO demultiplexer further including: at least one processor and at least one memory storing instructions that, based on being executed by the at least one processor, perform operations to control the values of the first relative phase shift, the second relative phase shift, and the third relative phase shift. The 2×2 optical MIMO demultiplexer further including a first optical attenuator configured to apply a first relative attenuation between the first pair of optical transmission paths. The 2×2 optical MIMO demultiplexer further including a second optical attenuator configured to apply a second relative attenuation between the third pair of optical transmission paths. The 2×2 optical MIMO demultiplexer where each of the first optical phase shifter, the second optical phase shifter, and the third optical phase shifter have a phase shifting range that is less than or equal to 2n. Implementations of the described techniques may include hardware, a method or process, or computer software on a computer-accessible medium.

Another general aspect includes an optical multi-input-multi-output (MIMO) receiver, including: an input port configured to receive input light; means for performing adaptive 2×2 optical MIMO polarization demultiplexing on the input light using 3-stage optical phase-shifting to output a first optical signal and a second optical signal; and at least one photodetector configured to detect the first optical signal and the second optical signal. Other embodiments of this aspect include corresponding computer systems, apparatus, and computer programs recorded on one or more computer storage devices, each configured to perform the actions of the methods.

Implementations may include one or more of the following features. The optical MIMO receiver where each stage of the 3-stage optical phase-shifting has a range less than or equal to 2n. Implementations of the described techniques may include hardware, a method or process, or computer software on a computer-accessible medium.

Another general aspect includes a method of performing 2×2 optical multi-input-multi-output (MIMO) demultiplexing, the method including: receiving light through a pair of MIMO inputs into a first pair of optical transmission paths; controlling a first optical phase shifter to apply a first relative phase shift between the first pair of optical transmission paths; combining the first pair of optical transmission paths with a first 2×2 optical coupler to output a second pair of optical transmission paths; controlling a second optical phase shifter to apply a second relative phase shift between the second pair of optical transmission paths; combining the second pair of optical transmission paths with a second 2×2 optical coupler to output a third pair of optical transmission paths; controlling a third optical phase shifter to apply a third relative phase shift between the third pair of optical transmission paths; combining the third pair of optical transmission paths with a third 2×2 optical coupler to output a fourth pair of optical transmission paths; and outputting the fourth pair of optical transmission paths through a pair of MIMO outputs. Other embodiments of this aspect include corresponding computer systems, apparatus, and computer programs recorded on one or more computer storage devices, each configured to perform the actions of the methods.

Implementations may include one or more of the following features. The method where controlling the first optical phase shifter includes applying a value of the first relative phase shift that is binary. The method where the value of the first phase shift is binary among $c+\pi/2$ and $c-\pi/2$, where c is a real number. The method where controlling the second optical phase shifter includes applying a value of the second relative phase shift within a finite range that includes $-n\pi$ and $+n\pi$, where n is an integer. The method where controlling the second optical phase shifter is performed by analog operation within a range $(-n\pi, +n\pi)$. The method where controlling the third optical phase shifter includes applying a value of the third relative phase shift within a finite range that depends on the value of the first relative phase shift. The method where controlling the third optical phase shifter further includes: controlling the third optical phase shifter to operate between 0 and $+n\pi$, based on the value of the first relative phase shift being $c-\pi/2$, and to operate between $-n\pi$ and 0, based on the value of the first relative phase shift being $c+\pi/2$, where n is an integer. The method where controlling the third optical phase shifter is performed by analog operation within a range $(0, +n\pi)$ or within a range $(-n\pi, 0)$, depending on the value of the first relative phase shift. The method, further including detecting a first reference signal on a first polarization channel in a first MIMO output of the pair of MIMO outputs, detecting a second reference signal on a second polarization channel in a second MIMO output of the pair of MIMO outputs, determining an amount of error measured from the first reference signal and the second reference signal; and controlling at least one of the first optical phase shifter, the second optical phase shifter, or the third optical phase shifter based on the amount of error measured from the first reference signal and the second reference signal. The method where the 2×2 optical MIMO demultiplexing is performed in an endless manner without resetting any of the first optical phase shifter, the second optical phase shifter, or the third optical phase shifter during operation. Implementations of the described techniques may include hardware, a method or process, or computer software on a computer-accessible medium.

Another general aspect includes an optical multi-input-multi-output (MIMO) receiver configured to perform optical MIMO polarization demultiplexing. The optical MIMO receiver includes an input port configured to receive input light; a polarization beam splitter and rotator (PBSR) configured to split the input light into a pair of optical transmission paths; an optical phase shifter configured to apply a relative phase shift between the pair of optical transmission paths; a 2×2 optical coupler configured to combine the pair of optical transmission paths; and a controller configured to control the optical phase shifter using a binary control with two states of operation for the relative phase shift that is applied between the pair of optical transmission paths. Other embodiments of this aspect include corresponding computer systems, apparatus, and computer programs recorded on one or more computer storage devices, each configured to perform the actions of the methods.

Another general aspect includes an optical multi-input-multi-output (MIMO) receiver configured to perform optical MIMO polarization demultiplexing. The optical MIMO receiver includes an input port configured to receive input light; a polarization beam splitter and rotator (PBSR) configured to split the input light into a pair of optical transmission paths; an optical attenuator configured to apply a relative attenuation between the pair of optical transmission paths; a 2×2 optical coupler configured to combine the pair of optical transmission paths; and a controller configured to control the relative attenuation that is applied by the optical attenuator. Other embodiments of this aspect include corresponding computer systems, apparatus, and computer programs recorded on one or more computer storage devices, each configured to perform the actions of the methods.

Implementations may include one or more of the following features. The optical MIMO receiver where the optical attenuator is a differential optical attenuator that is configured to apply (i) a first attenuation to one of the pair of optical transmission paths, and (ii) a second attenuation to another of the pair of optical transmission paths, where the first attenuation and the second attenuation are equal in magnitude in decibels and opposite in sign. The optical MIMO receiver, further including a second optical attenuator configured to apply a second relative attenuation between a second pair of optical transmission paths, where the second pair of optical transmission paths includes light that has been attenuated by the optical attenuator, and where the controller is further configured to control the second relative attenuation that is applied by the second optical attenuator. Implementations of the described techniques may include hardware, a method or process, or computer software on a computer-accessible medium.

In some implementations, the techniques described herein for optical MIMO polarization demultiplexing can be applied to general 2×2 optical MIMO demultiplexing. For example, in some implementations, the techniques described herein can be implemented separately from or without the PBSR.

The details of one or more implementations of the subject matter of this disclosure are set forth in the accompanying drawings and the description below. Other features, aspects, and advantages of the subject matter will become apparent from the description, the drawings, and the claims.

BRIEF DESCRIPTION OF THE DRAWINGS

FIGS. 1A and 1B illustrate examples of dual-polarization communication systems that utilize coherent detection and direct detection (IMDD);

FIGS. 5A and 5B illustrate examples of transmitters configured to transmit reference signals (e.g., pilot tones);

DETAILED DESCRIPTION

Figure 2:
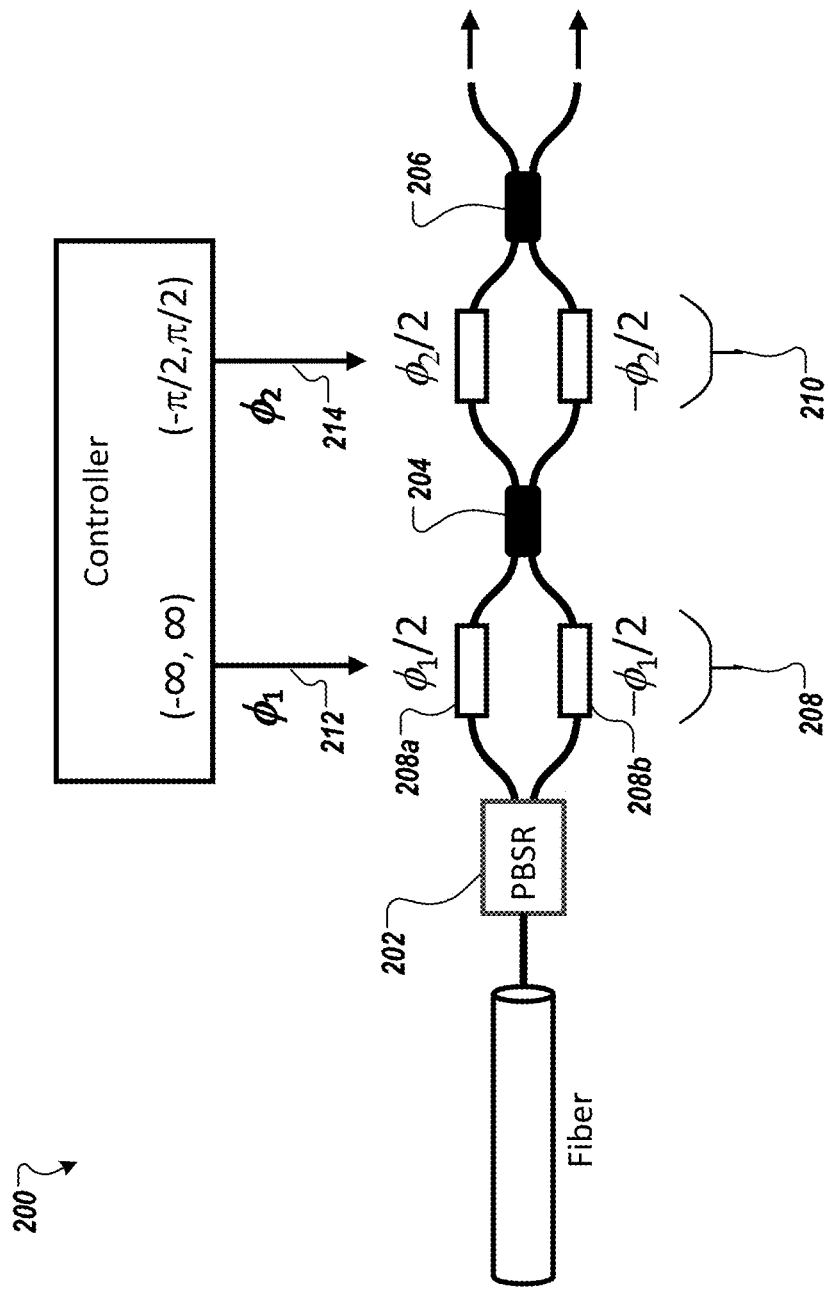
FIG. 2 illustrates an example of an optical polarization demultiplexer with two control signals.

Systems and techniques are disclosed herein that provide novel multi-stage optical MIMO demultiplexers (e.g., optical MIMO polarization demultiplexers) which can achieve significantly improved efficiency and speed with lower rates of data loss. This is accomplished by novel implementations which enable an "endless" property of adaptive demultiplexing without requiring any resets of interruptions of data reception. In some implementations, this is achieved by an adaptive three-stage phase-shifting demultiplexer structure in which the first stage phase-shifter is controlled to apply a binary value, and the second and third stages of phase-shifting are controlled to operate over finite ranges (e.g., continuous ranges) of phase shifting values. The control of the three stages of phase-shifting are coordinated to adapt to random and unpredictable rotations and losses in received polarization, without requiring any resets of the phase-shifting that would interrupt signal reception, a property referred to as an "endless" operation of the demultiplexer.

In general, multi-polarization detection is challenging, because polarization states tend to drift as an optical waveform travels through a communication system (e.g., due to randomly changing birefringence in fiber transmission lines). Over a long-distance system, these random drifts of polarization can accumulate progressively without limit. In an optical communication system which uses polarization division multiplexing (PDM) to transmit different signals over the two polarization modes of light, the random and unknown polarization drifting creates challenges for a receiver to accurately detect the proper orientation of the two polarization modes, resulting in the different signals becoming mixed at the receiver (sometimes referred to as "cross-talk"). Hence, even though a signal is transmitted in one polarization mode, the signal may actually be received in both polarization modes at the receiver. In addition to polarization drift, other non-idealities in an optical communication system may degrade performance, such as polarization dependent loss (PDL), which amplifies or attenuates different polarization modes differently.

To compensate for polarization drift and other non-idealities, a multi-polarization receiver must do constant, adaptive MIMO demultiplexing to separate and unmix the signals that are transmitted in the two polarization modes. Such MIMO multiplexing may be performed either in the optical domain using optical phase shifters or in the electronic domain by digital signal processing (DSP). Optical MIMO demultiplexing provides various advantages over DSP-based MIMO demultiplexing. For example, optical demultiplexing can reduce power consumption, complexity, and sensitivity to the symbol rate. By contrast, DSP-based demultiplexing typically requires higher power consumption, and can become prohibitively complex for high symbol-rate or large mode-number systems.

Furthermore, optical polarization demultiplexing can be used in conjunction with intensity modulation and direct detection (IMDD) transmission formats (in which information is transmitted only in the magnitude squared of the optical electric field), such as pulse amplitude modulation (PAM). This is because optical demultiplexing can be performed using optical elements that separate the two polarization modes of light, before photodetection is performed on the light. By contrast, DSP-based polarization demultiplexing cannot be used in conjunction with IMDD because the nonlinearity of optical direct detection in IMDD results in a loss of information, which cannot be recovered by DSP techniques alone. Instead, DSP-based demultiplexing typically requires coherent reception. In such systems, the two polarization modes of light are first separated by coherent detection, and then the full field of each polarization is detected, allowing the DSP to perform processing on the signals received in the two polarization modes. An example of this distinction is described with reference to FIGS. 1A and 1B, below.

FIGS. 1A and 1B illustrate examples of dual-polarization communication systems 100 and 150 that utilize coherent detection and direct detection (IMDD), respectively. The transmitters (102 and 152) implement polarization division multiplexing by first splitting a laser input light (104 and 154) into two optical transmission paths that lead to two modulators, a first modulator (106 and 156) and a second modulator (108 and 158). The first modulator (106 and 156) modulates the light in one optical transmission path with a first data stream x or X (110 and 160) and the second modulator (108 and 128) modulates the light in other optical transmission path with a second data stream y or Y (112 and 162). In the coherent case, x and y are complex numbers representing the optical field, whereas in the IMDD case, X and Y are real numbers representing the optical power. Throughout this disclosure, lower-case letters represent complex numbers (field) and upper-case letters represent real numbers (power). The two modulated optical waveforms, one modulated by x (X) and the other modulated by y (Y), are combined in a polarization beam splitter and rotator (PBSR) (114 and 164), which converts one of the optical waveforms into an orthogonal polarization. After the PBSR, the two optical waveforms carrying x (X) and y (Y) co-exist in the same optical transmission path but have orthogonal polarizations.

This dual-polarized (DP) optical waveform travels through a fiber link (116 and 166). As the DP waveform travels through the fiber, various unknown and varying birefringence and twists in the fiber can cause changes in the polarizations of the two waveforms. If the fiber link (116 and 166) does not have significant polarization-dependent loss (PDL), then the two polarizations remain orthogonal. For example, x (X) may evolve from a linear horizontal polarization to a right-hand circular polarization, which means that y (Y) evolves from a linear vertical polarization to a left-hand circular polarization. However, in the presence of PDL, the orthogonality of the polarizations in the DP optical waveform will degrade, which will complicate the demultiplexing of x (X) and y (Y).

At the receiver (118 and 168), the DP waveform enters a PBSR (120 and 162) which splits the DP waveform into two waveforms, h and v, which have orthogonal polarizations. Due to the non-idealities in the optical communication system, the outputs of the PBSR, h and v, are each a linear and orthogonal combination of x and y (more precisely, the received signals will be noisy versions of x and y due to additive noise in the system, but we will assume a noiseless scenario for the purposes of this discussion). In particular, h is a linear combination of x and y, and similarly v is a linear combination of x and y. For example, h=(x−y)/sqrt(2) and v=(x+y)/sqrt(2). The purpose of MIMO demultiplexing is to extract the original signals x and y from the received h and v. This can be done via DSP-based demultiplexing (as in FIG. 1A for coherent detection) or via optical demultiplexing (as in FIG. 1B for direct detection/IMDD).

In the coherent case of FIG. 1A, there is a local oscillator (LO) laser (122) with which h and v are interfered, in two optical 90-degree hybrids (124 and 126). The output waveforms from the hybrid 126 are photodetected by photodetectors 128 and the resulting electrical signals are fed into a digital signal processor (DSP) (130) which performs demultiplexing to separate signals x' and y' using MIMO signal processing. As such, in the example of coherent reception in FIG. 1A, since both the magnitude and phase of the optical field are detected by the receiver 118, MIMO demultiplexing must be done by the DSP 130 after detection by the photodetectors 128.

By contrast, in the example of IMDD reception in FIG. 1B, the receiver 168 detects the optical power. This nonlinearity results in a loss of information, which means that in a IMDD system, MIMO demultiplexing must be done in optics, before photodetection. This is because the optical phase information is lost in the photodetection in the IMDD case, so it is impossible to always recover x and y no matter how much electrical signal processing is done. In the example of FIG. 1B, h and v are each a linear and orthogonal combination of x and y. Therefore, there can be a fundamental loss of information if h and v are detected directly using IMDD without first demultiplexing. However, if h and v are optically demultiplexed into x and y before photodetection, then there is no loss of information.

For two orthogonal states of polarization, a PDM optical communication system can be represented as a 2×2 Multi-Input-Multi-Output (MIMO) channel. Thus, the optical transmission can be modeled as a 2×2 matrix, F. The matrix F is a transfer function describing polarization effects and chromatic dispersion of the communication from transmitter to receiver. For example, the matrix F can model the effects of the fiber that connects a transmitter and receiver, as well as the effects of the optical components in the transmitter and receiver themselves. For purposes of this disclosure, the matrix F will be referred to as a "channel matrix F" with the understanding that the "channel" can represent various effects of the optical communication system, such as the fiber transmission line and components of the transmitter and/or receiver.

$$\begin{bmatrix} h \\ v \end{bmatrix} = F \begin{bmatrix} x \\ y \end{bmatrix}$$

To estimate the original signals x and y from the received signals h and v, an optical demultiplexer D is applied at the receiver, to generate estimates x' and y':

$$\begin{bmatrix} x' \\ y' \end{bmatrix} = DF \begin{bmatrix} x \\ y \end{bmatrix}$$

Then, as long as x'=ax and y'=bx (where "a" and "b" are complex constants), then the receiver will have successfully demultiplexed the polarizations.

Consider the simpler case of a lossless system (where the optical channel matrix F is unitary), which is approximately the case in most short fiber-optic links. In such scenarios, fiber loss is negligible, especially fiber polarization-dependent loss (PDL). The channel matrix F can then be characterized by four real numbers. Since the receiver only needs to achieve x'=ax and y'=bx for successful demultiplexing, the demultiplexing matrix D can be characterized by two real numbers. Thus, for a lossless scenario, the four real numbers of the channel matrix F can be expressed as only two, independently-controlled real parameters which should be compensated by the demultiplexing matrix D.

Thus, for a unitary system (lossless scenario), the optical demultiplexer (i.e., the matrix D above) requires a theoretical minimum of at least two phase control signals to reverse the effects of the channel matrix F and demultiplex. An example of a 2-stage demultiplexer is describe with reference to FIG. 2, below. However, using just two phase control signals in a demultiplexer has a problem in that the demultiplexing requires an infinite range of phase shifts to achieve the "endless" property, and is therefore not feasible using practical phase shifters. Instead, practical phase shifters have a finite limit on the range of phase shift. Therefore, while demultiplexing optical signals that have travelled through randomly changing phase distortions in a fiber, a phase shifter in a 2-stage demultiplexer will eventually reach an end of its practical range and must be "reset" which can cause interruptions and/or delays in the reception of data. An example of this problem is discussed below with reference to FIG. 2.

FIG. 2 illustrates an example optical polarization demultiplexer 200 with two control signals. Demultiplexer 200 consists of a polarization splitter and rotator (PBSR) 202, two 50/50 couplers 204 and 206, and two phase shifters 208 and 210 (e.g., differential phase shifters). The two phase shifters 208 and 210 are controlled by separate control signals $\varphi_1$ (212) and $\varphi_2$ (214). In the example of FIG. 2, each of the phase shifters 208 and 210 is a differential phase shifter. For example, phase shifter 208 is implemented as an interferometer with two individual phase shifting elements (208a and 208b) that adjust the optical phase in one direction in one arm of the interferometer and adjusts the optical phase in the opposite direction in the other arm. A similar structure is shown for phase shifter 210. Alternatively, in some implementations, each of the phase shifters 208 and 210 can be implemented as a non-differential phase shifter with just one phase shifting element in a single arm. The differential implementations shown in FIG. 2 has several advantages over a non-differential implementations. For example, the differential implementation has an advantage of requiring a smaller range per phase shifter. Furthermore, for a thermo-optic phase shifter, a differential phase shifter has half the worst-case power consumption as compared to a single phase shifter, and also has the benefit of constant total power consumption, which mitigates thermal transients. For purposes of this disclosure, a differential phase shifter (e.g., phase shifter 208) is considered as one phase shifter, with the understanding that it is implemented with two phase shifters (e.g., phase shifting elements 208a and 208b) but one control signal (e.g., $\varphi_1$, 212).

With this structure, the demultiplexer 200 can be represented as a matrix D (using the Mueller notation for polarization).

$$D = \begin{bmatrix} j\sin\frac{\phi_2}{2} & j\cos\frac{\phi_2}{2} \\ j\cos\frac{\phi_2}{2} & -j\sin\frac{\phi_2}{2} \end{bmatrix} \begin{bmatrix} e^{\frac{j\phi_1}{2}} & 0 \\ 0 & e^{\frac{-j\phi_1}{2}} \end{bmatrix}$$

However, as mentioned above, a major issue with the configuration of demultiplexer 200 in FIG. 2 is that the demultiplexing requires an infinite range of phase shifts for $\varphi_1$ (212) in order to achieve the "endless" property. In practical systems, this means that as the demultiplexer 200 demultiplexes signals received through a randomly changing fiber, the phase shift control $\varphi_1$ (212) will eventually reach an end of its practical range. For example, if the phase shifters 208 and 210 are implemented as thermo-optic phase shifters, then there is a practical limit on the amount of input current. If the randomly drifting phase caused by the channel F requires that $\varphi_1$ continuously increase, then at some point, due to the input limitations on $\varphi_1$, the phase shifter 208 must be reduced by a (so-called "reset"). However, during this reset, the reception of signals must be interrupted, resulting in possible loss of data and a potentially significant error burst in high-rate communications.

To address this problem, a demultiplexer can implement more than two stages of phase shifters. However, a greater number of phase shifting stages (for the lossless scenario using a unitary demultiplexer) increases the algorithmic and control complexity and reduces the speed of controlling the numerous phase shifting variables. Furthermore, it can be difficult to guarantee that the phase-shifting control does not get "trapped" in a particular state during its operation (and being unable to exit the trapped state without a phase shifter exceeding its limits), for an arbitrary input. In addition, higher-complexity control systems may face increased risk of converging to a local state which is not a desirable (e.g., suboptimal) multiplexing operation. Because of this complexity and uncertainty, designing dual-polarized IMDD systems can be challenging.

Furthermore, if polarization dependent loss (PDL) is present, then this can compound the challenges. PDL refers to two orthogonal polarizations being attenuated differently, resulting in a non-unitary channel matrix F. Although PDL is sometimes negligible in fibers, PDL can be significant in discrete devices such as amplifiers and wavelength division multiplexers. Designing non-unitary optical demultiplexers is challenging. In general, a non-unitary demultiplexer can be characterized by four real numbers, with the theoretical minimum control set consisting of two optical phase shifters and two optical attenuators.

Implementations are disclosed herein that achieve an "endless" property of optical MIMO polarization demultiplexing using just three stages of finite-range phase shifting, for the lossless scenario of no PDL, an example of which is described with reference to FIG. 3, below. In addition, for the scenario of PDL, implementations are disclosed herein that achieves the "endless" property using just three stages of finite-range phase shifting and two stages of optical attenuation, an example of which is described with reference to FIG. 4, below.

Figure 3:
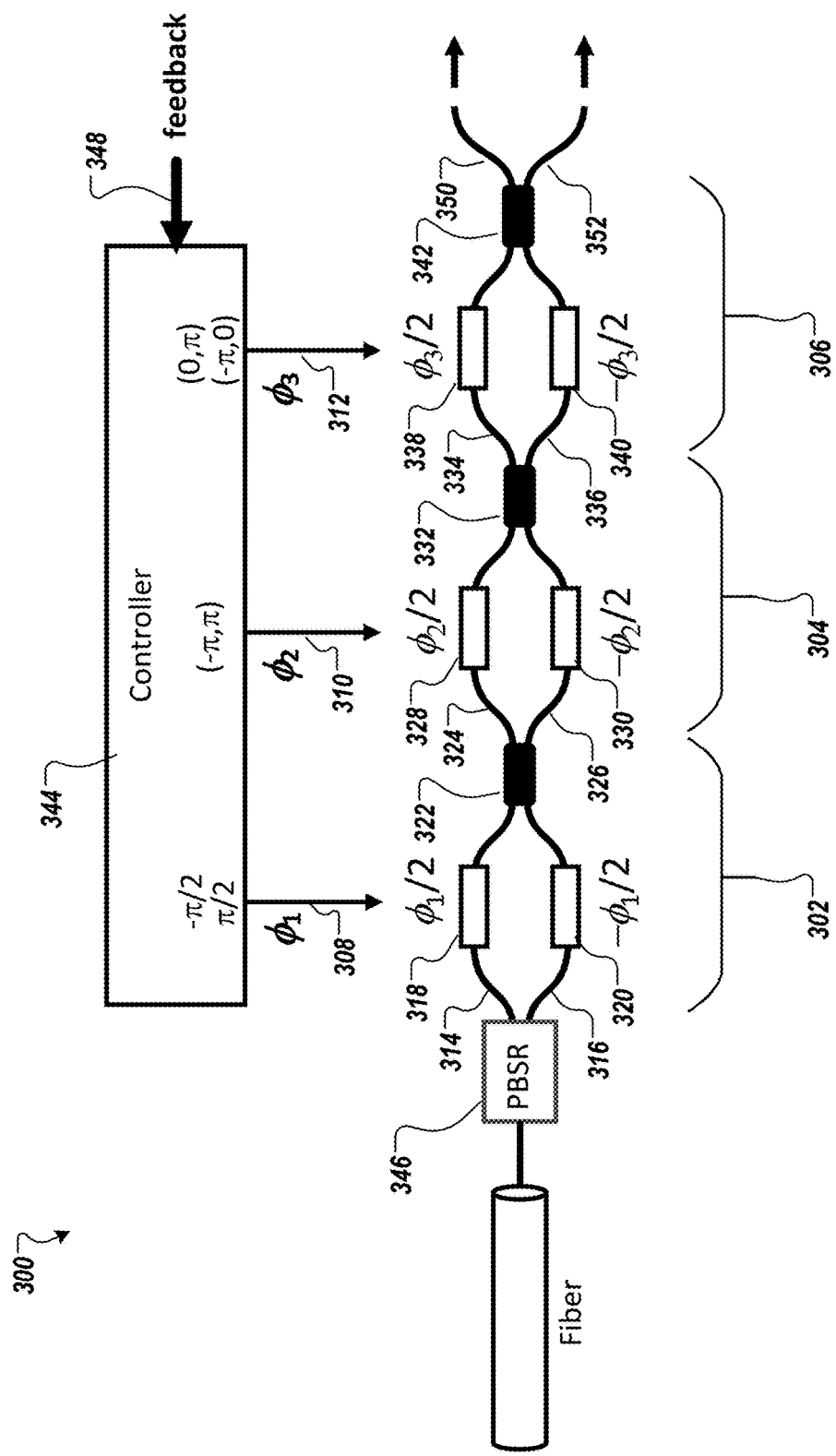
FIG. 3 illustrates an example of an optical polarization demultiplexer according to implementations of the present disclosure.

FIG. 3 illustrates an example optical polarization demultiplexer 300 according to implementations of the present disclosure. The demultiplexer 300 can be implemented as part of a direct detection receiver (e.g., receiver 168 in FIG. 1). In some implementations, demultiplexer 300 is implemented via integrated photonics which can reduce cost compared to bulk optics.

The demultiplexer 300 includes three stages (302, 304, and 306) of phase shifting. Each stage is controlled by a phase shift control signal. For example, the first stage 302 is controlled by a first control signal 308, the second stage 304 is controlled by a second control signal 310, and the third stage 306 is controlled by a third control signal 312. Each control signal controls the amount of phase shift that is implemented in the respective phase shifting stage.

In the example of FIG. 3, each stage has a phase shifter and a 2×2 coupler that operate on a pair of optical transmission paths. For example, the first stage 302 has pair of transmission paths 314 and 316, optical phase shifting elements 318 and 320 (together forming a differential phase shifter), and a 2×2 coupler 322. Similarly, the second stage 304 has a pair of transmission paths 324 and 326, optical phase shifting elements 328 and 330 (together forming a differential phase shifter), and a 2×2 coupler 332. Finally, the third stage 306 has a pair of transmission paths 334 and 336, optical phase shifting elements 338 and 340 (together forming a differential phase shifter), and a 2×2 coupler 342.

Although the example of FIG. 3 shows differential implementations of phase shifters, some implementations may use non-differential implementations with just one optical phase shifting element (in one transmission path) in a stage. Throughout this disclosure, the phase difference between the two optical transmission paths (in a stage) is referred to simply as "$\varphi$," regardless of whether the phase shift is implemented by a differential phase shifter (i.e., each phase shifting element in the differential pair designed to shift by +/−$\varphi$/2, as shown in the example of FIG. 3) or implemented by a non-differential phase shifter (which shifts the phase of light in just one transmission path by an amount +/−$\varphi$ relative to light in the other transmission path). As such, the term "phase shifter" can apply to a differential phase shifter or to a non-differential phase shifter.

The phase shifters can be thermo-optic (thermo-optic phase shifter, TOPS), electro-optic (electro-optic phase shifter, EOPS), or other types. The TOPS generally have the slowest response time but can be sped up by covering with metal and/or shortening the distance to the heat sink. The power consumption of the TOPS can be reduced by having the optical transmission path pass through the heated region multiple times. The EOPS can operate on, for example, current injection, carrier depletion, or the Pockels effect. Each phase shifter could consist of multiple sections, such as a section with a phase shifter type that has a fast response time but more power consumption and a section with a phase shifter type that has a slow response time but reduced power consumption.

The 2×2 couplers can be, for example, implemented by directional couplers, multi-mode interference couplers, or adiabatic couplers.

As mentioned above, the three stages (302, 304, 306) of demultiplexer 300 are controlled within specific ranges or values of operations in a coordinated manner, so as to ensure that the demultiplexer 300 can achieve an "endless" property of demultiplexing without requiring a reset of any of the phase shifters. In particular, in the example of FIG. 3, the first control signal $\varphi_1$ for the first stage 302 is digital, with a value of either −π/2 or +π/2. The second control signal $\varphi_2$ for the second stage 304 can be analog or digital, operating over a continuous or discrete set of values between −π and +π. The third control signal $\varphi_3$ for the third stage 306 can be analog or digital, operating over a continuous or discrete set of values within a range that depends on the first control signal $\varphi_1$, namely operating between 0 and +π when $\varphi_1$ is −π/2 and operating between −π and 0 when $\varphi_1$ is +π/2.

During operation of the demultiplexer 300, light that has traveled through a fiber first enters the splitter, such as PBSR 346, which splits the input light into the two optical transmission paths 314 and 316. The PBSR splits the input light into two polarizations and rotates one of the polarizations so that both outputs of the PBSR are in the same polarization. Thus, although path 314 contains light that was in one polarization when it entered the PBSR and path 316 contains light that was in the orthogonal polarization when it entered the PBSR, once in paths 314 and 316, the light in both paths 314 and 316 are in the same polarization. Although the example of FIG. 3 shows the splitter implemented by PBSR 346, other types of splitters can be used, including passive photonic integrated devices such as a polarization splitting grating coupler (PSGC).

The split input light enters the two optical transmission paths 314 and 316 of the first stage 302, and undergo relative phase shifts through phase shifting elements 318 and 320, such that light in one optical transmission path is phase-shifted by an amount $\varphi_1$ relative to light in the other optical transmission path. The amount of this relative phase shift $\varphi_1$ is controlled by the control signal 308. The phase-shifted light in the two optical transmission paths then enter a 2×2 coupler 322 which combines the relative phase-shifted light. This process repeats through the second stage 304 and the third stage 306, undergoing different phase shifts controlled by control signals $\varphi_2$ (310) and $\varphi_3$ (312).

A controller 344 controls the amount of relative phase shift in the three stages 302, 304, and 306 via the control signals 308, 310, and 312. In scenarios of closed-loop feedback, this control can be based on feedback information 348 which can be, for example, a measurement of an error in the received signal. The specific algorithms that are used by the controller 344 for controlling and coordinating the control signals 308, 310, and 312 will be described with reference to FIGS. 8 to 10, below. Although FIG. 3 shows the controller 344 as part of the demultiplexer 300, in some implementations, the controller 344 may be implemented separately in a receiver (as another component in receiver 168 of FIG. 1).

As discussed above, demultiplexer 300 compensates for random birefringence changes which rotate the polarizations of light, caused by distortions introduced by the optical communication system. In addition to compensating for phase shifts, a demultiplexer can also be designed to compensate for other non-idealities, such as polarization dependent loss (PDL). While PDL may be negligible in most short fiber-optic links, as the length of the fiber increases, PDL can have a more substantial impact on proper reception of the optical signals.

In scenarios of polarization dependent loss (PDL), the amount of loss experienced in each of the two polarization modes of light may be different, e.g., the loss in the transverse magnetic (TM) mode may be greater/smaller than the loss in transverse electric (TE) mode. This results in a channel matrix F which is non-unitary. In this case, demultiplexing with phase shift controls alone may be insufficient to fully separate the signals which have been mixed in the two polarization modes of light. Instead, a combination of optical phase shifters and optical attenuators are implemented in the demultiplexer, as described with reference to FIG. 4, below. In general, PDL may be caused by the fiber line itself, or by other elements of the communication system, such as fiber connectors, isolators, amplifiers, splitters, fiber couplers, or PBSRs.

Figure 4:
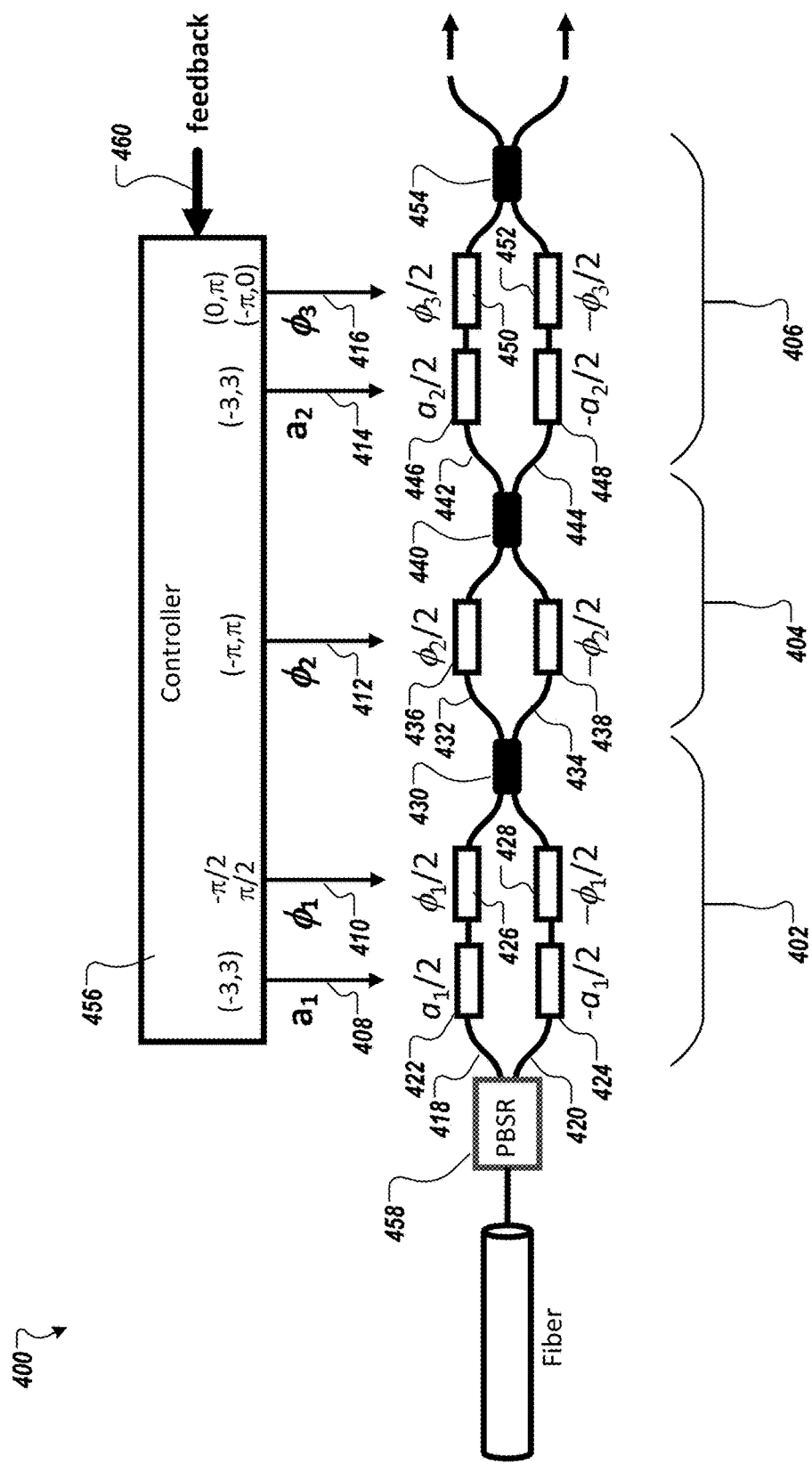
FIG. 4 illustrates another example of an optical polarization demultiplexer according to implementations of the present disclosure.

FIG. 4 illustrates an example optical polarization demultiplexer 400 according to implementations of the present disclosure. The demultiplexer 400 can be implemented as part of a direct detection receiver (e.g., receiver 168 in FIG. 1). In some implementations, demultiplexer 400 is implemented via integrated photonics which can reduce cost compared to bulk optics. The demultiplexer 400 provides both relative attenuation control and relative phase shift control between the two polarization modes of light, to compensate for PDL in the received optical waveform.

Demultiplexer 400 includes three stages (402, 404, and 406) of relative phase shift control and/or optical attenuation control. Each stage is controlled by one or more control signals. For example, the first stage 402 is controlled by a first attenuation control signal 408 and a first phase shift control signal 410. The second stage 404 is controlled by a second phase shift control signal 412. The third stage 406 is controlled by a second attenuation control signal 414 and a third phase shift control signal 416. Each control signal controls the amount of phase shift or optical attenuation that is implemented in the respective stage.

In the example of FIG. 4, the first stage 402 has first and second optical transmission paths 418 and 420, first and second optical attenuators 422 and 424 (together forming a differential attenuator), first and second phase shifting elements 426 and 428 (together forming a differential phase shifter), and a 2×2 coupler 430. The second stage 404 has first and second optical transmission paths 432 and 434, first and second phase shifting elements 436 and 438 (together forming a differential phase shifter), and a 2×2 coupler 440. Finally, the third stage 406 has first and second optical transmission paths 442 and 444, first and second optical attenuators 446 and 448 (together forming a differential attenuator), first and second phase shifting elements 450 and 452 (together forming a differential phase shifter), and a 2×2 coupler 454.

Although the example of FIG. 4 shows differential implementations of the optical attenuators and optical phase shifters, some implementations may use non-differential implementations with just one optical attenuator (in one optical transmission path) and one phase shifting element (in one optical transmission path) in a stage. Throughout this disclosure, the relative optical attenuation between the two optical transmission paths is referred to simply as "a," regardless of whether the attenuation is implemented by a differential attenuator (i.e., each attenuator in the differential pair designed to attenuate light by +/− a/2, as shown in the example of FIG. 4) or implemented by a single optical attenuator (which attenuates light in just one optical transmission path by an amount +/− a relative to light in the other optical transmission path). The attenuation "a" for an optical attenuator represents any suitable measure of attenuation, such as exponential loss where the actual effect on transmission of light is exponential in "a" (e.g., the field is multiplied by $\exp\{-a/2\}$ when passing through an optical attenuator marked a/2, just as the field is multiplied by $\exp\{-\phi/2\}$ when passing through a phase shifter marked $\phi/2$.).

Similarly, the relative phase difference between the two optical transmission paths is referred to simply as "$\varphi$," regardless of whether the relative phase shift is implemented by a differential phase shifter (i.e., each phase shifting element in the differential pair designed to shift by +/−$\varphi$/2, as shown in the example of FIG. 3) or implemented by a non-differential phase shifter (which shifts the phase of light in just one optical transmission path by an amount +/−$\varphi$ relative to light in the other optical transmission path).

As mentioned above, the three stages of demultiplexer 400 are controlled within specific ranges or values of operations in a coordinated way, so as to ensure that the demultiplexer 400 can achieve an "endless" property of demultiplexing without requiring a reset of any of the phase shifters. For the phase shift control, in the example of FIG. 4, the first phase shift control signal $\varphi_1$ (410) for the first stage 402 is digital, with a value of either $-\pi/2$ or $+\pi/2$. The second phase shift control signal $\varphi_2$ (412) for the second stage 404 can be analog or digital, operating over a continuous or discrete set of values between $-\pi$ and $+\pi$. The third phase shift control signal $\varphi_3$ (416) for the third stage 406 can be analog or digital, operating over a continuous or discrete set of values within a range that depends on the first control signal $\varphi_1$ (410), namely operating between 0 and $+\pi$ when $\varphi_1$ is $-\pi/2$ and operating between $-\pi$ and 0 when $\varphi_1$ is $+\pi/2$. For the attenuation control, each of the first attenuation control signal $a_1$ (408) and the second attenuation control signal $a_2$ (414) operate over a continuous or discrete set of values within a range. For example, the range may be (−3, +3). As another example, the range may be (−1, +1). As yet another example, the range may be (−0.6, +0.6), corresponding to approximately −5.2 dB to +5.2 dB. Other suitable ranges may be used.

During operation of the demultiplexer 400, light that has traveled through a fiber first enters the splitter, such as PBSR 458, which splits the input light into the two optical transmission paths 418 and 420. Although the example of FIG. 4 shows the splitter implemented by PBSR 458, other types of splitters can be used, including passive photonic integrated devices such as a polarization splitting grating coupler (PSGC). The split input light enters the two optical transmission paths 418 and 420 of the first stage 402, and undergo relative attenuation through optical attenuators 422 and 424 such that light in one optical transmission path is attenuated relative to light in the other optical transmission path. The amount of this relative attenuation a1 is controlled by the attenuation control signal 408.

The relatively-attenuated light in the two optical transmission paths then undergo relative phase shifts through phase shifting elements 426 and 428 (forming a differential phase shifter), such that the phase of light in one optical transmission path is shifted relative to the phase of light in the other optical transmission path. The amount of this relative phase shift $\varphi_1$ is controlled by the control signal 410. The phase-shifted light in the two optical transmission paths then enter a 2×2 coupler 430 which combine the relative phase-shifted light. This process continues through the second stage 404 and the third stage 406, so that the two polarizations of light undergo relative phase shifts and/or relative attenuations controlled by phase control signals 412 and 416 and the attenuation control signal 414.

A controller 456 controls the amount of relative attenuation and relative phase shift the different stages 402, 404, and 406 via the control signals 408, 410, 412, 414, and 416. By controlling both the relative attenuation and the relative phase shift between the two polarizations of light, demultiplexer 400 is able to compensate for both random phase shifts as well as PDL (non-unitary channel matrix F). In scenarios of closed-loop feedback, this control can be based on feedback information 460 which can be, for example, a measurement of an error in the received signal. The specific algorithms that are used by the controller 456 for controlling and coordinating the control signals 408, 410, 412, 414, and 416 will be described with reference to FIGS. 8 to 10, below. Although FIG. 4 shows the controller 456 as part of the demultiplexer 400, in some implementations, the controller 456 may be implemented separately in a receiver (as another component in receiver 168 of FIG. 1).

In general, the control (e.g., by controller 344 in FIG. 3 or 456 in FIG. 4) is designed to reduce the amount of crosstalk between signals that are received in the two polarization modes of an optical waveform. In the scenario of feedback control, the controller can adapt the controls based on feedback information (e.g., feedback 348 in FIG. 3 and feedback 460 in FIG. 4). The feedback information may include, for example, a measurement of errors in the received waveform. The controller can be designed to adapt the control signals to reduce the measured error. The measurement of errors can be implemented in various ways. As an example, the measurement of error can reflect the amount of crosstalk between signals in the two polarization modes of light.

To measure of the amount of crosstalk, in some implementations, the communication system may utilize reference signals (e.g., pilot tones or pilot signals) which are transmitted in addition to the signals carrying information. The reference signals have waveform properties which are known to both the transmitter and receiver, and allow the receiver to estimate and compensate for the random effects of the communication channel.

FIGS. 5A and 5B illustrate examples of transmitters 500 and 520 configured to transmit reference signals (e.g., pilot tones), according to implementations of the present disclosure. Transmitter 500 of FIG. 5A transmits pilot tones 502 (A) and 504 (B) in respective optical polarization modes the laser input. In some implementations, pilot tones 502 and 504 are low-frequency tones, and can have different tone frequencies for the two polarizations. For example, the first pilot tone 502 can be transmitted at a 1-MHz frequency, and the second pilot tone 504 can be transmitted at a 2-MHz frequency. The modulation depths of the pilot tones 502 and 504 are a fraction of the signal average power, for example, the modulation depth of the pilot tones 502 and 504 can be 2% of the signal average power.

In the example of FIG. 5A, the pilot tones 502 (A) and 504 (B) are added to the electronic signals 506 (X) and 508 (Y), respectively, prior to modulating the laser input in each waveguide. For example, the pilot tones 502 (A) and 504 (B) can be applied by adding the tones digitally to digital-to-analog converter (DAC) outputs. Alternatively, the pilot tones 502 (A) and 504 (B) can be applied by adding them in an analog manner to the input of drivers of modulators 510 and 512, or internal to the drivers of modulators 510 and 512, or to the output of the drivers of modulators 510 and 512.

FIG. 5B illustrates an example transmitter 520 showing further details of the modulation and pilot tones. In this example, pilot tones 522 (A) and 524 (B) are applied by adding them to the modulation signals 526 (X) and 528 (Y), respectively, in an analog manner at the output of drivers 534 and 536 of modulators 530 and 532, respectively. In the example of FIG. 5B, the modulators 530 and 532 are shown implemented as Mach-Zehnder interferometer (MZI) modulators, but other suitable optical modulators may be used.

Thus, in transmitters 500 and 520 of FIGS. 5A and 5B, the pilot tones A and B are added to the input signals X and Y, respectively, and combined in the PBSR 514 and 538 for transmission over the fiber. In particular, pilot tone A and signal X are transmitted in one polarization mode of light, while pilot tone B and signal Y are transmitted in the other polarization mode of light. The combined optical PDM waveform propagates through the communication system towards the receiver, during which time various non-idealities in the system cause random and unpredictable rotational drifting of the two polarizations modes, as well as polarization-dependent loss (PDL). These non-idealities affect both the pilot tone and the signal that propagate in each polarization mode. Since the pilot tones (A and B) are known, the receiver can measure the deviation (or error) of the received pilot tones as compared to the original pilot tones (A and B), and this provides the receiver with an estimate of the error in the signals X and Y themselves. Then, based on error estimates, the receiver is able to compensate for polarization drift and PDL, and more accurately recover the signals X and Y.

Examples of receiver structures for detecting pilot tones and measuring error in received pilot tones are discussed with reference to FIGS. 6, 7A, and 7B, below. Examples of using such error measurements in feedback control of relative phase shifts and/or relative attenuation are discussed with reference to FIGS. 9 and 10, below.

Figure 6:
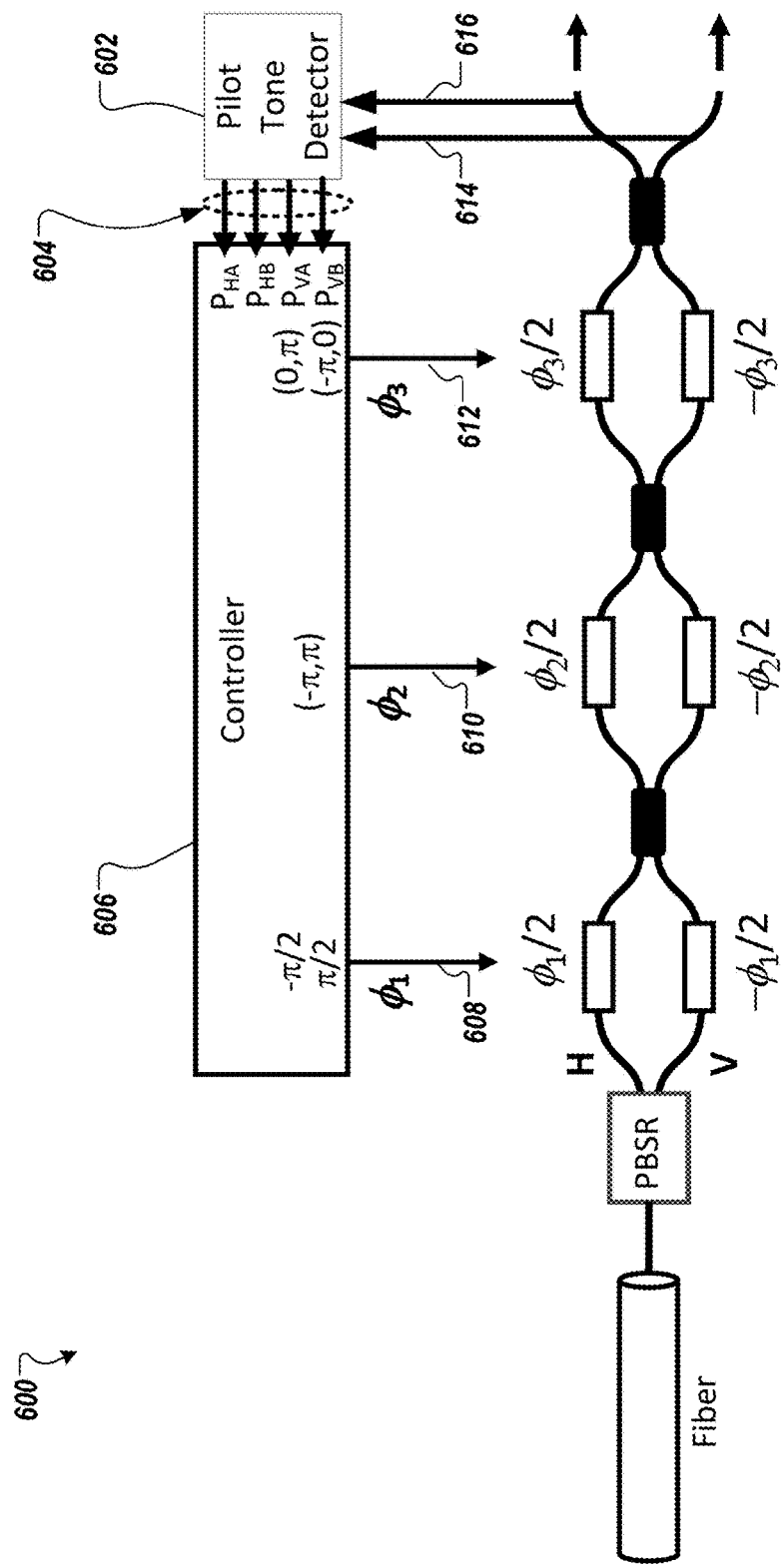
FIG. 6 illustrates an example of a demultiplexer configured to receive reference signals (e.g., pilot tones) to generate feedback information, according to implementations of the present disclosure.

FIG. 6 illustrates an example demultiplexer 600 configured to receive pilot tones to generate feedback information, according to implementations of the present disclosure. At the receiver 600, the received waveforms 614 and 616 in the two polarizations of received light processed by a pilot tone detector 602 to detect the power of the received pilot tones in each polarization mode 614 and 616. The pilot tone detector 602 then provides one or more pilot tone measurements 604 to the controller 606 as feedback information (e.g., as feedback 348 in FIG. 3 and feedback 460 in FIG. 4). The controller 606 uses these pilot tone measurements 604 to adapt the control signals (608, 610, 612) which apply relative phase shifts and/or relative attenuations to the received optical signal.

Although FIG. 6 shows the controller 606 and pilot tone detector 602 as part of the demultiplexer 600, in some implementations, the controller 606 and/or pilot tone detector 602 can be implemented separately in a receiver (as another component in receiver 168 of FIG. 1). Furthermore, although FIG. 6 shows controller 606 and pilot tone detector 602 as separate modules, in some implementations, the controller 606 and pilot tone detector 602 may be implemented by integrated circuitry without being separated into distinct modules. Furthermore, although the example of FIG. 6 shows a scenario of only adapting relative phase shifts via control signals 608, 610, and 612 (e.g., as in the demultiplexer 300 of FIG. 3), these techniques can also be applied to adapt both relative phase shifts and relative attenuation (e.g., as in the demultiplexer 400 of FIG. 4).

In example of FIG. 6, it is assumed that a first pilot tone (A) was transmitted in a first polarization mode (referred to as X), while a second pilot tone (B) was transmitted in a second polarization mode (referred to as Y). At the receiver, it is desired that the received polarization modes (H and V) satisfy H=X and V=Y. However, as the optical waveform travels through a communication system, the two polarizations modes carrying the two pilot tones (A and B) can undergo random and unpredictable rotations, due to polarization drifting and PDL. Therefore, upon receiving these randomly rotated polarization modes, when the demultiplexer 600 attempts to detect the pilot tones A and B, the demultiplexer 600 could actually detect a cross-mixture of the pilot tones A and B in each polarization modes H and V.

To estimate the impact of this cross-mixing, the receiver can detect the power of each pilot tone (A and B) in each of the two polarization modes (H and V). For example, in FIG. 6, the pilot tone detector 602 can detects four different quantities: the power of tone A in polarization mode H (referred to as $P_{HA}$), the power of tone B in polarization mode H (referred to as $P_{HB}$) and power of tone A in polarization mode V (referred to as $P_{VA}$), and the power of tone B in polarization mode V (referred to as $P_{VB}$). Among these four quantities, $P_{HB}$ and $P_{VA}$ represent the amount of cross-talk between the pilot tones A and B in the two polarization modes H and V.

The controller 610 then calculates an error signal based on these received pilot tone components, to estimate the amount of cross-talk between the two polarization modes that have been induced by non-idealities in the communication system. For example, in some implementations, the error can be calculated as:

$$e = \sqrt{\frac{P_{HB}}{P_{HA}} + \frac{P_{VA}}{P_{VB}}}$$

However, other measures of error can be used to estimate the amount of cross-talk between the pilot tones (A and B) in the two polarization modes (H and V). In general, the measure of error should increase with increasing values of $P_{HB}$ and/or $P_{VA}$. The measure of error provides an estimate of how well the controller 606 is adapting the control signals (e.g., 608, 610, and 612) to adjust the relative phase shift and/or relative attenuation between the two polarization modes H and V, to compensate for random polarization drifts and PDL. Thus, the controller 606 can use this error measurement in a feedback control loop to dynamically adjust the control signals (e.g., 608, 610, and 612) to further reduce the error. Details of example feedback algorithms are described with reference to FIGS. 9 and 10, below.

The pilot tones A and B can be detected from the received waveform at various points in the receiving process, examples of which are described with reference to FIG. 7A and FIG. 7B, below.

Figure 7A:
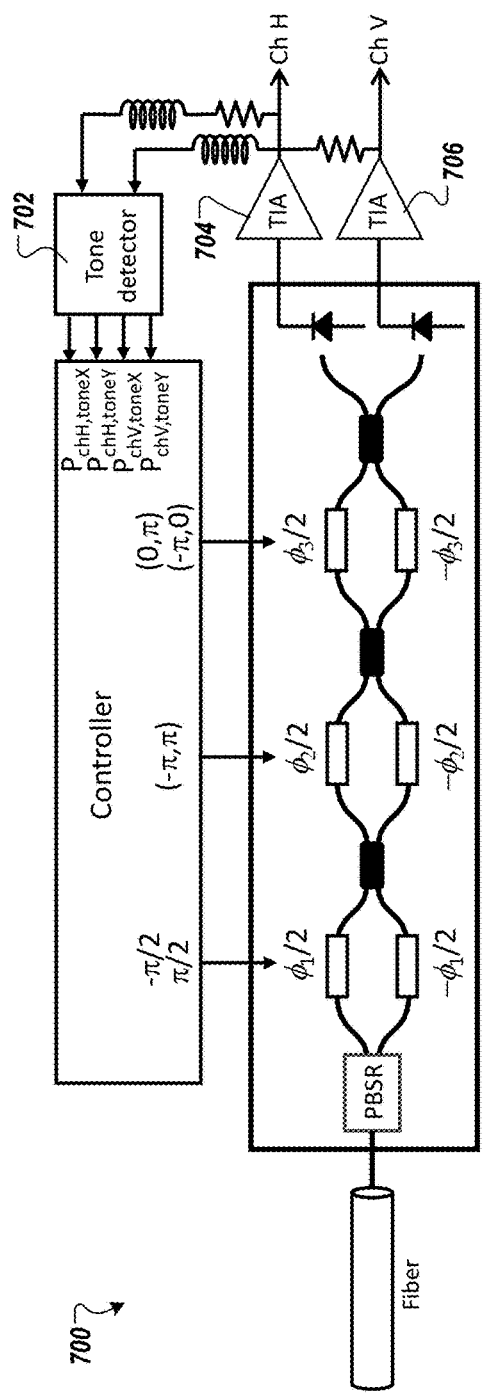
FIGS. 7A and 7B illustrate examples of demultiplexers configured to receive and process reference signals (e.g., pilot tones), according to implementations of the present disclosure.
Figure 7B:
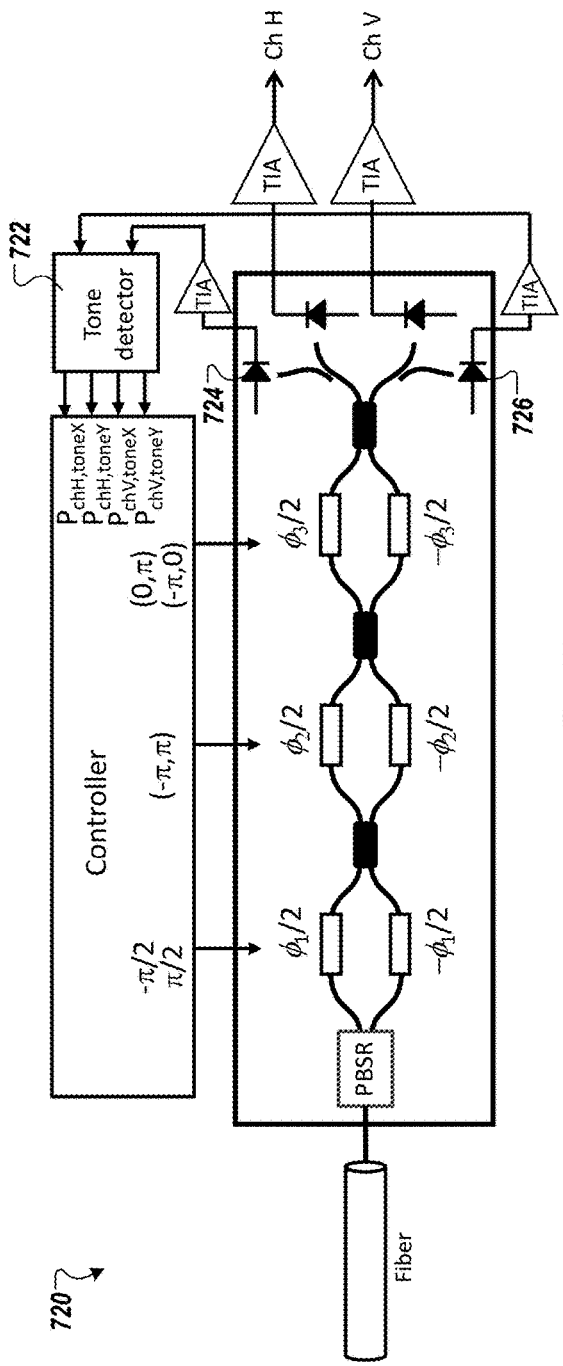

FIGS. 7A and 7B illustrate examples of different implementations of demultiplexers configured to receive and process pilot tones, according to implementations of the present disclosure. Specifically, FIGS. 7A and 7B illustrate examples of detecting the pilot tones (A and B) at different points in the receiving process. As discussed above, the power of each pilot tone A and B in each of the two polarization modes (H and V) should be detected. In the example demultiplexer 700 of FIG. 7A, pilot tones (A and B) are detected from the received waveform at the output of a transimpedance amplifier (TIA) 704 and TIA 706. Alternatively, as shown in the example demultiplexer 720 of FIG. 7B, pilot tones (A and B) are detected from the received waveform in the optical domain, specifically at the output of separate photodiodes 724 and 726 which are coupled to the received optical signals via optical couplers.

In both examples of FIGS. 7A and 7B, the various received powers of the pilot tone components can be detected, for example, by using Fourier transform techniques, such as multiplying the received signal by a sine and/or cosine at the pilot tone frequency, and summing the result or filtering the result with a narrowband electrical filter.

Next, examples of using error measurements in feedback control of relative phase shifts and/or relative attenuation are discussed with reference to FIGS. 8 to 10. The control system acts to minimize the error that is measured in the received optical waveform. When the error is minimized, then each of the PDM signals is received in a respective polarization mode (e.g., signal X is received in polarization mode H and signal Y is received in polarization mode V) with minimal crosstalk.

Figure 8:
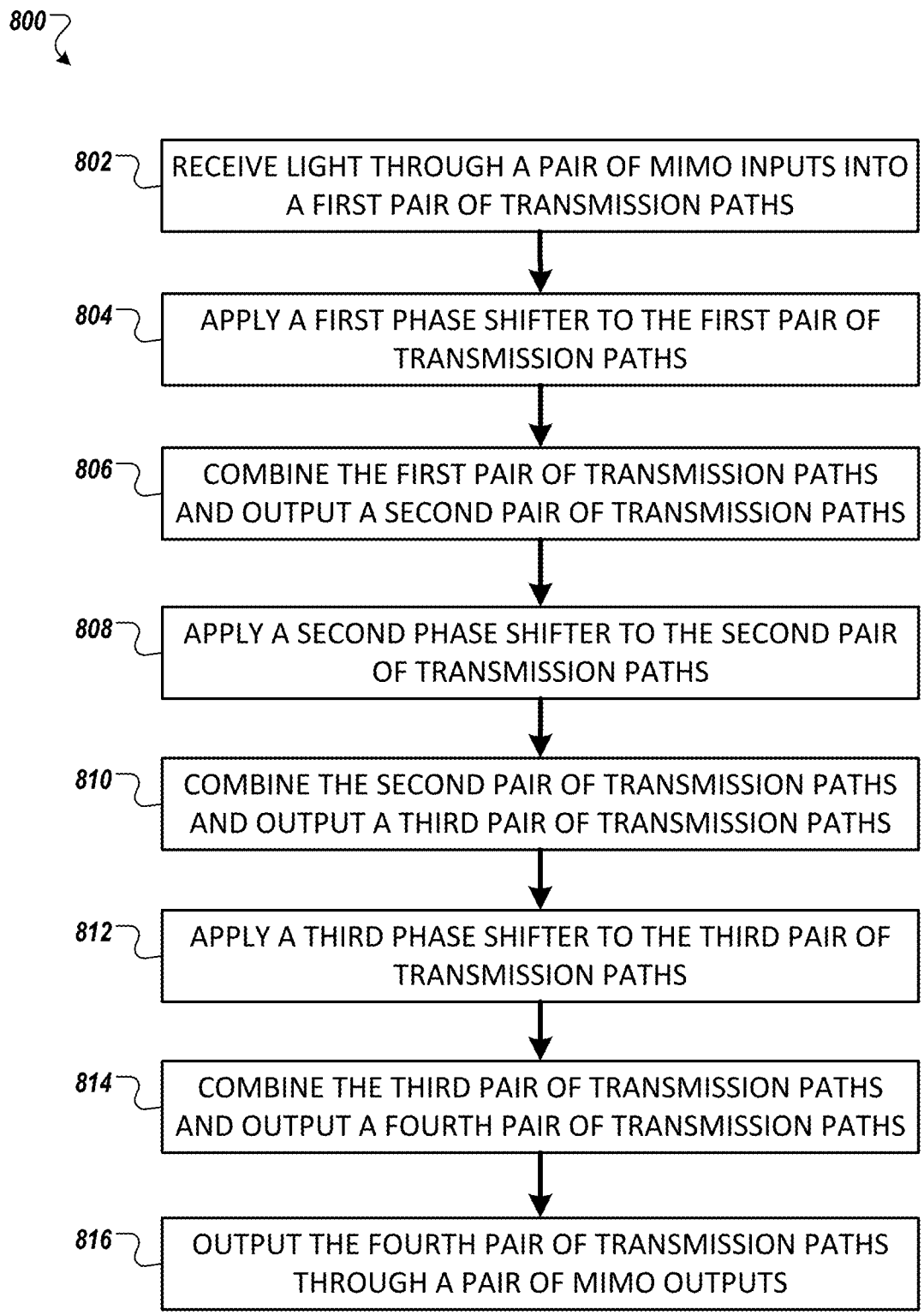
FIG. 8 is a flow chart illustrating an example of controlling an optical polarization demultiplexer, according to implementations of the present disclosure.

FIG. 8 is a flow chart illustrating an example method 800 of controlling an optical polarization demultiplexer, according to implementations of the present disclosure. The method 800 can be used to control relative phase shifts in demultiplexer, such as demultiplexer 300 of FIG. 3.

In step 802, light is received through a pair of MIMO inputs into a first pair of optical transmission paths (314, 316). In step 804, a first optical phase shifter (e.g., the differential phase shifter formed by 318 and 320) is controlled to apply a first relative phase shift between the first pair of optical transmission paths (314, 316). In some implementations, the first optical phase shifter can be controlled in a binary manner, for example with values $(c+\pi/2)$ and $(c-\pi/2)$, where "c" is a real number reflecting an offset. This control can be based on feedback information (e.g., using pilot tones).

In step 806, the first pair of optical transmission paths (314, 316) is combined with a first 2×2 optical coupler (322) to output a second pair of optical transmission paths (324, 326).

In step 808, a second optical phase shifter (e.g., the differential phase shifter formed by 328 and 330) is controlled to apply a second relative phase shift between the second pair of optical transmission paths (324, 326). In some implementations, the second optical phase shifter can be controlled within a finite range of values that includes $-n\pi$ and $+n\pi$, where "n" is an integer. For example, this can be by analog operation within a range $(-n\pi, +n\pi)$. This control can be based on feedback information (e.g., using pilot tones).

In step 810, the second pair of optical transmission paths (324, 326) is combined with a second 2×2 optical coupler (332) to output a third pair of optical transmission paths (334, 336).

In step 812, a third optical phase shifter (e.g., the differential phase shifter formed by 338 and 340) is controlled to apply a third relative phase shift between the third pair of optical transmission paths (334, 336). In some implementations, the third optical phase shifter can be controlled within a finite range that depends on the value of the first relative phase shift. For example, as described above, the third optical phase shifter can be controlled to operate between 0 and $+n\pi$ if the first relative phase shift is equal to $(c-\pi/2)$, and to operate between $-n\pi$ and 0 if the first relative phase shift is equal to $(c+\pi/2)$, where "n" is an integer. This can be done by analog operation within the ranges $(0, +n\pi)$ and $(-n\pi, 0)$. This control can be based on feedback information (e.g., using pilot tones).

In step 814, the third pair of optical transmission paths (334, 336) is combined with a third 2×2 optical coupler (342) to output a fourth pair of optical transmission paths (350, 352). In step 816, the fourth pair of optical transmission paths (350, 352) is then output through a pair of MIMO outputs.

Although the example method 800 in FIG. 8 shows a specific ordering of steps, one or more of these steps can be performed in a different order. For example, the control of the first, second, and third optical phase shifters can be performed in a different order. A specific example of controlling and coordinating the three phase shifters is described with reference to FIG. 9.

Figure 9:
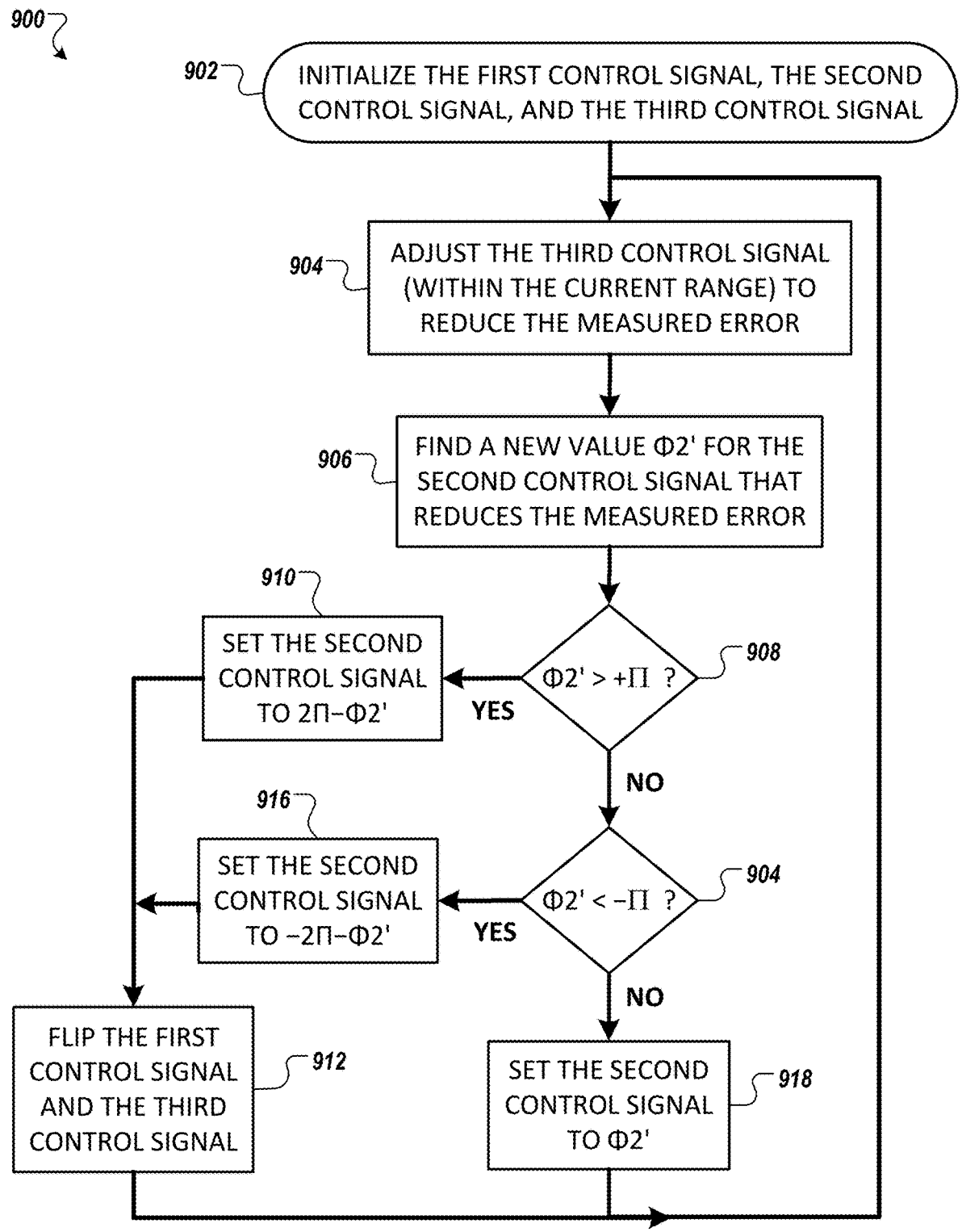
FIG. 9 is a flow chart illustrating an example of controlling relative phase shift values in an optical polarization demultiplexer, according to implementations of the present disclosure.

FIG. 9 is a flow chart illustrating an example method 900 of controlling relative phase shift values in an optical polarization demultiplexer, according to implementations of the present disclosure. The method 900 shows a particular way of coordinating the first, second, and third phase shifters to achieve an "endless" property of optical MIMO polarization demultiplexing using just the three stages of finite-range phase shifting (for the lossless scenario of no PDL). For purposes of illustration, the description of method 900 will be provided with reference to demultiplexer 300 of FIG. 3.

The method 900 is an iterative process that adapts the relative phase shift control signals 308, 310, and 312 to gradually reduce the measured feedback error (e.g., feedback 348 in FIG. 3, or feedback 604 in FIG. 6).

In step 902, at the beginning of the iterations, the demultiplexer initializes the relative phase shift values of the three control signals 308, 310, and 312. For example, in some implementations, the first control signal $\varphi_1$ (308) is a binary (digital) value, initially set to either $-\pi/2$ or $+\pi/2$. The second control signal $\varphi_2$ (310) is a continuous (analog) or discrete (digital) value, initially set to a value somewhere between $-\pi$ and $+\pi$. The third control signal $\varphi_3$ (312) is also a continuous (analog) or discrete (digital) value, and is either set to a value somewhere between 0 and $+\pi$ if the first control signal $\varphi_1$ (308) was set to $-\pi/2$, and otherwise the third control signal $\varphi_3$ (312) is set to a value somewhere between $-\pi$ and 0 if the first control signal $\varphi_1$ (308) was set to $+\pi/2$. This relationship between the third control signal $\varphi_3$ (312) and the first control signal $\varphi_1$ (308) is maintained throughout the control process of method 900.

In step 904, the third control signal $\varphi_3$ (312) is adjusted (within its current range) to reduce the measured error in the feedback (e.g., feedback 348 of FIG. 3). The adjustment of the third control signal $\varphi_3$ (312) can be performed by an optimization or pseudo-optimization algorithm (e.g., a gradient descent algorithm) that seeks to minimize or reduce the measured error. For example, the adjustment of the third control signal $\varphi_3$ (312) can be performed by searching within a local neighborhood of the current value of third control signal $\varphi_3$ (312) to find a new value that reduces the measured error. As a specific example, a description will be given in which the third control signal $\varphi_3$ (312) is adjusted in steps of $+/-\Delta\varphi_3$ to find a value that reduces measured error. The step size $\Delta\varphi_3$ can be dynamically adjusted in each iteration. If the value of the third control $\varphi_3$ (312) is within $\Delta\varphi_3$ of the end of its range (i.e., within $\Delta\varphi_3$ of either 0, $+\pi$, or $-\pi$), then the third control signal $\varphi_3$ (312) is not changed. Otherwise, the third control signal $\varphi_3$ (312) is first increased by $\Delta\varphi_3$ and the resulting error in feedback 348 is measured. Then, the third control signal $f_3$ (312) is decreased by 243 (i.e., decreased by $\Delta\varphi_3$ from the original value) and the resulting error in feedback 348 is again measured. The value of the third control signal $\varphi_3$ (312) that resulted in the lower error is assigned as the new, adjusted value of the third control signal $\varphi_3$ (312).

In step 906, the second control signal $\varphi_2$ (310) is adjusted to reduce the measured error. The adjustment of the second control signal $\varphi_2$ (310) can be performed by an optimization or pseudo-optimization algorithm (e.g., a gradient descent algorithm) that seeks to minimize or reduce the measured error. For example, the adjustment of the second control signal $\varphi_2$ (310) can be performed by searching within a local neighborhood of the current value of second control signal $\varphi_2$ (310) to find a new value that reduces the measured error. As a specific example, a description will be given in which the second control signal $\varphi_2$ (310) is adjusted in steps of $+/-\Delta\varphi_2$ to find a value that reduces measured error. The step size $\Delta\varphi_2$ can be dynamically adjusted in each iteration. For example, in some implementations, the step size $\Delta\varphi_2$ can be configured to increase as the value $\sin^2(\varphi_3)$ (of the third control signal 312) becomes smaller. In the search process of step 906, the second control signal $\varphi_2$ (310) is first increased by $\Delta\varphi_2$ and the resulting error in feedback 348 is measured. Then, the second control signal $\varphi_2$ (310) is decreased by $2\Delta\varphi_2$ (i.e., decreased by $\Delta\varphi_2$ from the original value) and the resulting error in feedback 348 is again measured. The value of the second control signal $\varphi_2$ (310) that resulted in the lower error is denoted as $\varphi_2'$ (for purposes of this description).

In step 908, the demultiplexer determines whether the value $\varphi_2'<-\pi$ (i.e., outside the lower limit). If so, then in step 910, the new adjusted value of the second control signal $\varphi_2$ (310) is set to $-2\pi-\varphi_2'$. Furthermore, in step 912, the first control signal $\varphi_1$ (308) and the third control signal $\varphi_3$ (312) are flipped in values. Namely, if the value of the first control signal (308) is $\varphi_1=-\pi/2$ (meaning that the third control signal 312 is within a range 0 and $+\pi$), then then a value of n is simultaneously added to the first control signal $\varphi_1$ (308) and subtracted from the third control signal $\varphi_3$ (312). Alternatively, if the value of the first control signal (308) is $\varphi_1=+\pi/2$ (meaning that the third control signal 312 is within a range $-\pi$ and 0), then a value of n is simultaneously subtracted from the first control signal $\varphi_1$ (308) and added to the third control signal $\varphi_3$ (312). The control loop should pause during this simultaneous addition and subtraction. In some implementations, the simultaneous addition and subtraction of n may be performed sequentially (e.g., adjusting the first control signal $\varphi_1$ (308) and then adjusting the third control signal $\varphi_3$ (312), or vice versa). Nonetheless, the procedure of adjusting the first control signal $\varphi_1$ (308) and the third control signal $\varphi_3$ (312) described above should be performed quickly to avoid long pauses and control lag in the control system.

If it is determined in step 908 that $\varphi_2'$ is not outside the lower limit, then in step 914, the demultiplexer checks whether $\varphi_2'>+\pi$ (i.e., outside the upper limit). If so, then in step 916, the new adjusted value of the second control signal $\varphi_2$ (310) is set to $+2n-\varphi_2'$. Furthermore, in step 912 (as described above), the values of the first control signal $\varphi_1$ (308) and the third control signal $\varphi_3$ (312) are flipped.

If it is determined in step 914 that $\varphi_2'$ is not outside the upper limit (meaning that $\varphi_2'$ is within the range of $-\pi$ to $+\pi$), then in step 918, the new adjusted value of the second control signal $\varphi_2$ (310) is set to $\varphi_2'$. In this case, the first control signal $\varphi_1$ (308) and the third control signal $\varphi_3$ (312) are not flipped. Then, the next iteration of adjusting the control signals is performed, returning back to step 904.

The control process of method 900 can achieve an "endless" operation of demultiplexing without requiring a reset or interruption of data reception. This property is enabled by the fact that when the second control signal $\varphi_2$ (310) reaches either of end points ($+\pi$ or $-\pi$), then the second stage of phase shifting (304 in FIG. 3) behaves as a pass-through. At this point, when the second control signal $\varphi_2$ (310) is at an end point of its range, then $\pi$ is added or subtracted from the first control signal $\varphi_1$ (308) and the third control signal $\varphi_3$ (312) simultaneously (as discussed above in step 912). As such, an "endless" operation of polarization demultiplexing can be achieved, without requiring any reset or interruptions of data reception.

Although the example method 900 in FIG. 9 shows a specific ordering of steps, one or more of these steps can be performed in a different order. For example, steps 908 and 914, namely checking whether the second control signal $\varphi_2$ (310) is within the lower and upper bounds of the range $-\pi$ to $+\pi$, can be reversed.

Furthermore, the specific ranges of values described in step 902 can be modified. For example, the possible values of the first control signal $\varphi_1$ (308) can have a fixed offset, so as to be a shifted binary value of $(-\pi/2+c)$ or $(+\pi/2+c)$. The possible values of the second control signal $\varphi_2$ (310) could be shifted by integer multiples of $2\pi$, as long as the end points of the range enable the pass-through property discussed above. The possible values of the third control signal $\varphi_3$ (312) could also be shifted by integer multiples of $2\pi$.

Figure 10:
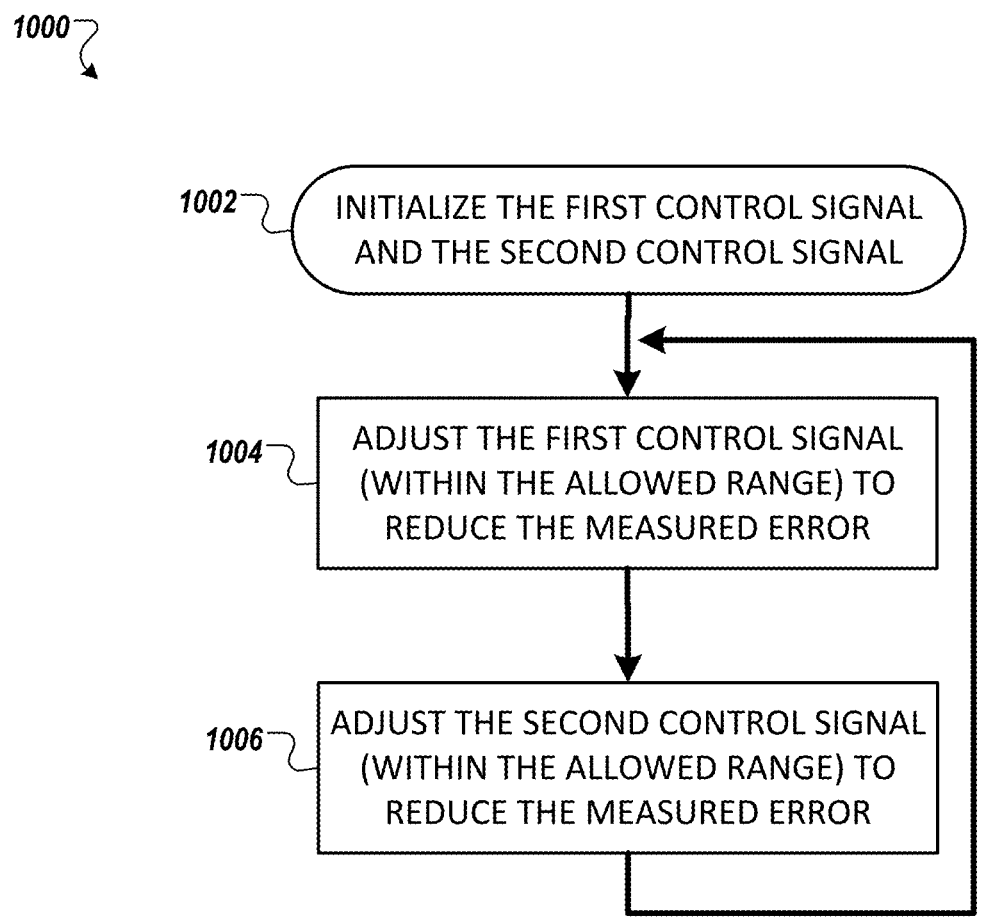
FIG. 10 is a flow chart illustrating an example of controlling relative attenuation values in an optical polarization demultiplexer, according to implementations of the present disclosure.

FIG. 10 is a flow chart illustrating an example method 1000 of controlling relative attenuation values in an optical polarization demultiplexer, according to implementations of the present disclosure. The method 1000 can be used to control relative attenuation signals, such as relative attenuation control signals $a_1$ (408) and $a_2$ (414) in the demultiplexer 400 of FIG. 4. For purposes of illustration, the description of method 1000 will be provided with reference to demultiplexer 400 of FIG. 4.

Although the example method 1000 illustrates control of both relative attenuation control signals $a_1$ (408) and $a_2$ (414), in some scenarios only one of the signals is implemented. For example, in some implementations, only the first control signal $a_1$ is implemented. This may be appropriate, for example, in scenarios where the PDL levels are moderate (e.g., in scenarios where the only source of PDL is in the receiver, rather than in the fiber transmission line itself). Furthermore, if the PDL values are not expected to change significantly over time, then the control value $a_1$ can be set once at the beginning of operation (e.g., in a factory), and left unchanged.

Alternatively, as shown in method 1000, both optical attenuation control signals $a_1$ and $a_2$ are can be adjusted (e.g., continuously), for example by using variable optical attenuators (VOAs). This may be appropriate, for example, in scenarios where PDL levels are more significant (e.g., in scenarios where PDL occurs in both the receiver and in the fiber transmission line).

In general, the relative attenuation signals $a_1$ (408) and $a_2$ (414) can be controlled using an optimization or pseudo-optimization process, designed to reduce or minimize the measured error in the feedback (e.g., feedback 460 in FIG. 4, or feedback 604 in FIG. 6). For example, in some implementations, the relative attenuation control signals $a_1$ (408) and $a_2$ (414) can be controlled simultaneously through joint optimization. As another example, which is shown in the method 1000 of FIG. 10, an iterative process can be implemented to adapt the relative attenuation control signals $a_1$ (408) and $a_2$ (414) to gradually reduce the measured feedback error.

In step 1002, at the beginning of the iterations, the demultiplexer initializes the two VOA control signals $a_1$ (408) and $a_2$ (414) to initial values, for example to zero values.

In step 1004, the first VOA control signal $a_1$ (408) is adjusted (within its allowed range, such as $-3$ to $+3$) to reduce the measured error in the feedback. The adjustment of the first VOA control signal $a_1$ (408) can be performed by an optimization or pseudo-optimization algorithm (e.g., a gradient descent algorithm) that seeks to minimize or reduce the measured error. For example, the adjustment of the first VOA control signal $a_1$ (408) can be performed by searching within a local neighborhood of the current value of first VOA control signal $a_1$ (408) to find a new value that reduces the measured error. As a specific example, a description will be given in which the first VOA control signal $a_1$ (408) is adjusted in steps of $+/-\Delta a_1$ to find a value that reduces measured error. The step size $\Delta a_1$ can be dynamically adjusted in each iteration. The first VOA control signal $a_1$ (408) is first increased by $\Delta a_1$ and the resulting error in feedback 460 is measured. Then, the first VOA control signal $a_1$ (408) is decreased by $2\Delta a_1$ (i.e., decreased by $\Delta a_1$ from the original value) and the resulting error in feedback 460 is again measured. The value of the first VOA control signal $a_1$ (408) that resulted in the lower error is assigned as the new, adjusted value of the first VOA control signal $a_1$ (408).

In step 1006, the second VOA control signal $a_2$ (414) is adjusted (within its allowed range, such as −3 to +3) to reduce the measured error. The adjustment of the second VOA control signal $a_2$ (414) can be performed by an optimization or pseudo-optimization algorithm (e.g., a gradient descent algorithm) that seeks to minimize or reduce the measured error. For example, the adjustment of the second VOA control signal $a_2$ (414) can be performed by searching within a local neighborhood of the current value of second control signal $a_2$ (414) to find a new value that reduces the measured error. As a specific example, a description will be given in which the second VOA control signal $a_2$ (414) is adjusted in steps of $+/-\Delta a_2$ to find a value that reduces measured error. The step size $\Delta a_2$ can be dynamically adjusted in each iteration. For example, in some implementations, the step size $\Delta a_2$ can be configured to increase as the value $\sin^2(a_1)$ (of the first VOA control signal 408) becomes smaller (and vice versa). In the search process of step 1006, the second VOA control signal $a_2$ (414) is first increased by $\Delta a_2$ and the resulting error in feedback 460 is measured. Then, the second VOA control signal $a_2$ (414) is decreased by $2\Delta_2$ (i.e., decreased by $\Delta a_2$ from the original value) and the resulting error in feedback 460 is again measured. The value of the second VOA control signal $a_2$ (414) that resulted in the lower error is assigned as the new, adjusted value of the second VOA control signal $a_2$ (414). Then, the next iteration of adjusting the control signals is performed, returning back to step 1004.

Although the example method 1000 in FIG. 10 shows a specific ordering of steps, one or more of these steps can be performed in a different order. For example, steps 1004 and 1006 can be reversed. Furthermore, the specific ranges of values can be modified. For example, the range of values −3 to +3 for the first and second VOA controls signals can be modified to different ranges of values.

In some implementations, the techniques described herein for optical MIMO polarization demultiplexing can be applied to general 2×2 optical MIMO demultiplexing. For example, in some implementations, the techniques described herein can be implemented separately from or without the PBSR.

Figure 11:
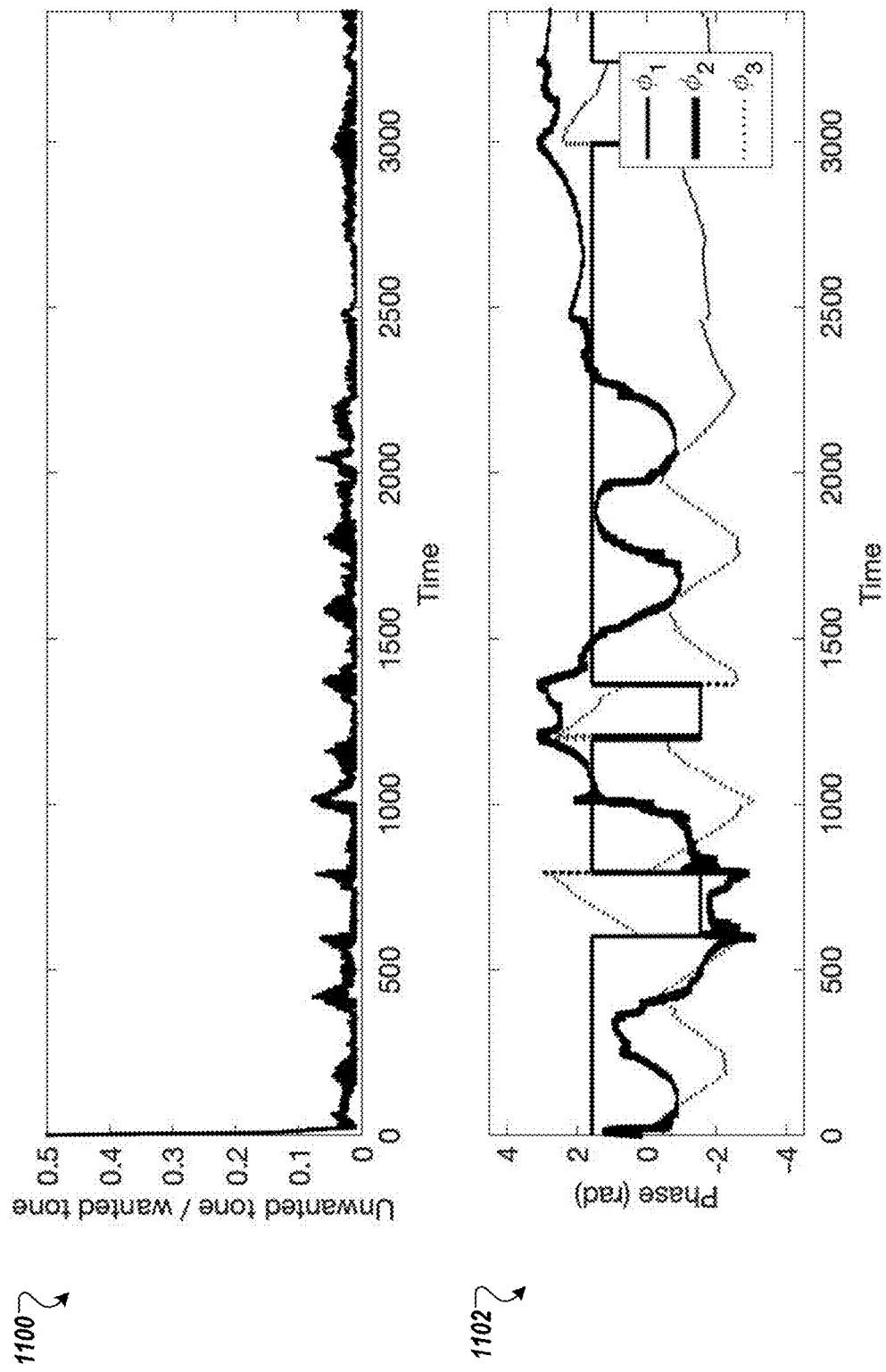
FIG. 11 illustrates examples of simulation results of an optical polarization demultiplexer according to implementations of the present disclosure.

FIG. 11 illustrates examples of simulation results showing an operation of a PDM MIMO demultiplexer according to implementations of the present disclosure. In the simulation results of FIG. 11, the light which is input to the demultiplexer (simulating light that is received from a fiber transmission line) is continuously and randomly polarization-scrambled. The demultiplexer (e.g., demultiplexer 300 of FIG. 3) is then controlled to continuously demultiplex the received signals.

Graph 1102 shows an example of an evolution of the three control signals $\varphi_1$ (308), $\varphi_2$ (310), and $\varphi_3$ (312) over time, as they are adjusted by the control algorithm. Graph 1100 shows an example of the resulting amount of crosstalk, namely the error "e" discussed above.

Figure 12:
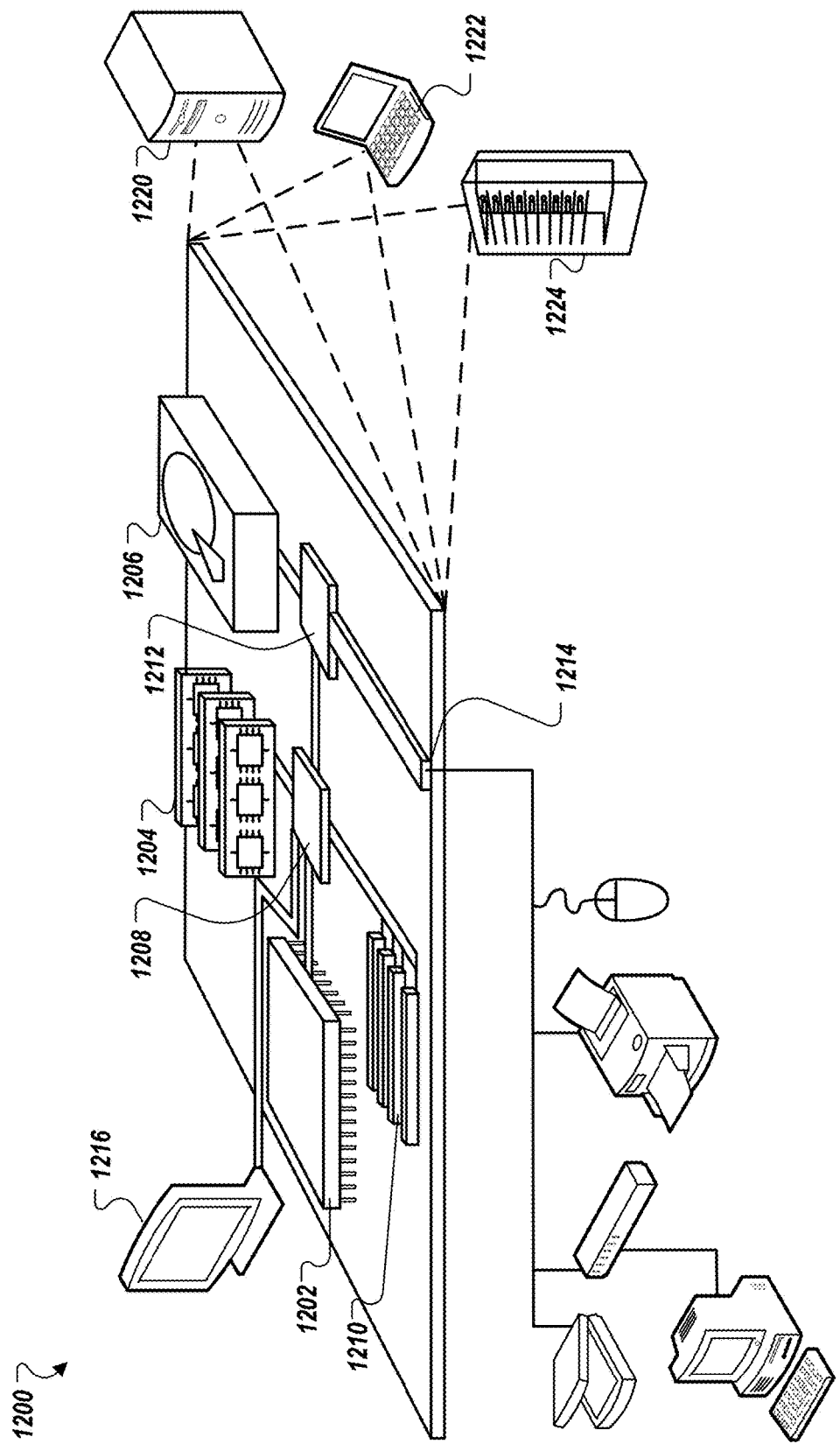
FIG. 12 is a diagram illustrating an example of a computing system that can be used to implement one or more components of a system that performs adaptive control of an optical polarization demultiplexer.

FIG. 12 is a diagram illustrating an example computing system 1200 that can be used to implement one or more components of a system that performs adaptive control of an optical polarization demultiplexer. The computing system 1200 can be used to implement the techniques described herein. For example, one or more parts of a controller (e.g., controller 344 of FIG. 3, controller 456 of FIG. 4, controller 606 of FIG. 6) and/or a pilot tone detector (e.g., pilot tone detector 602 of FIG. 6) could be implemented by components of computing system 1200 described here.

The computing system 1200 is intended to represent various systems that include digital computers, such as laptops, desktops, workstations, personal digital assistants, servers, blade servers, mainframes, and other appropriate computers. The components shown here, their connections and relationships, and their functions, are meant to be examples only, and are not meant to be limiting.

The computing system 1200 includes a processor 1202, a memory 1204, a storage device 1206, a high-speed interface 1208 connecting to the memory 1204 and multiple high-speed expansion ports 1210, and a low-speed interface 1212 connecting to a low-speed expansion port 1214 and the storage device 1206. Each of the processor 1202, the memory 1204, the storage device 1206, the high-speed interface 1208, the high-speed expansion ports 1210, and the low-speed interface 1212, are interconnected using various busses, and may be mounted on a common motherboard or in other manners as appropriate. The processor 1202 can process instructions for execution within the computing system 1200, including instructions stored in the memory 1204 or on the storage device 1206 to display graphical information for a GUI on an external input/output device, such as a display 1216 coupled to the high-speed interface 1208. In other implementations, multiple processors and/or multiple buses may be used, as appropriate, along with multiple memories and types of memory. In addition, multiple computing devices may be connected, with each device providing portions of the operations (e.g., as a server bank, a group of blade servers, or a multi-processor system). In some implementations, the processor 1202 is a single-threaded processor. In some implementations, the processor 1202 is a multi-threaded processor. In some implementations, the processor 1202 is a quantum computer.

The memory 1204 stores information within the computing system 1200. In some implementations, the memory 1204 is a volatile memory unit or units. In some implementations, the memory 1204 is a non-volatile memory unit or units. The memory 1204 may also be another form of computer-readable medium, such as a magnetic or optical disk.

The storage device 1206 is capable of providing mass storage for the computing system 1200. In some implementations, the storage device 1206 may be or include a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 1202), perform one or more methods, such as those described above. The instructions can also be stored by one or more storage devices such as computer- or machine-readable mediums (for example, the memory 1204, the storage device 1206, or memory on the processor 1202). The high-speed interface 1208 manages bandwidth-intensive operations for the computing system 1200, while the low-speed interface 1212 manages lower bandwidth-intensive operations. Such allocation of functions is an example only. In some implementations, the high-speed interface 1208 is coupled to the memory 1204, the display 1216 (e.g., through a graphics processor or accelerator), and to the high-speed expansion ports 1210, which may accept various expansion cards (not shown). In the implementation, the low-speed interface 1212 is coupled to the storage device 1206 and the low-speed expansion port 1214. The low-speed expansion port 1214, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing system 1200 may be implemented in a number of different forms, as shown in the figure. For example, it may be implemented as a standard server 1220, or multiple times in a group of such servers. In addition, it may be implemented in a personal computer such as a laptop computer 1222. It may also be implemented as part of a rack server system 1224.

The term "system" as used in this disclosure may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. Sometimes a server is a general-purpose computer, and sometimes it is a custom-tailored special purpose electronic device, and sometimes it is a combination of these things.

Implementations can include a back end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

While this disclosure contains many specific implementation details, these should not be construed as limitations on the scope of any invention or of what may be claimed, but rather as descriptions of features that may be specific to particular implementations of particular inventions. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results.

What is claimed is:

1. A 2×2 optical multi-input-multi-output (MIMO) demultiplexer, comprising:
   a pair of MIMO inputs configured to input light into a first pair of optical transmission paths;
   a first optical phase shifter configured to apply a first relative phase shift between the first pair of optical transmission paths;
   a first 2×2 optical coupler configured to combine the first pair of optical transmission paths and output a second pair of optical transmission paths;
   a second optical phase shifter configured to apply a second relative phase shift between the second pair of optical transmission paths;
   a second 2×2 optical coupler configured to combine the second pair of optical transmission paths and output a third pair of optical transmission paths;

a third optical phase shifter configured to apply a third relative phase shift between the third pair of optical transmission paths;

a third 2×2 optical coupler configured to combine the third pair of optical transmission paths and output a fourth pair of optical transmission paths;

a pair of MIMO outputs configured to output the fourth pair of optical transmission paths, which are output from the third 2×2 optical coupler, as a pair of demultiplexed output light signals; and a controller configured to control the first optical phase shifter to apply a value of the first relative phase shift that varies in a discontinuous manner, control the second optical phase shifter to apply a value of the second relative phase shift that varies in a continuous manner, and control the third optical phase shifter to apply a value of the third relative phase shift that varies in a continuous manner.

2. The 2×2 optical MIMO demultiplexer of claim 1, wherein the controller is configured to control the first optical phase shifter such that the value of the first relative phase shift varies in a binary manner.

3. The 2×2 optical MIMO demultiplexer of claim 2, wherein the value of the first relative phase shift is binary between $c+\pi/2$ and $c-\pi/2$, where c is a real number.

4. The 2×2 optical MIMO demultiplexer of claim 1, wherein the controller is configured to control the second optical phase shifter such that the value of the second relative phase shift is continuous within a finite range that includes $-n\pi$ and $+n\pi$, where n is an integer.

5. The 2×2 optical MIMO demultiplexer of claim 4, wherein the controller is configured to control the second optical phase shifter in an analog manner such that the value of the second relative phase shift various continuously within a range $(-n\pi, +n\pi)$.

6. The 2×2 optical MIMO demultiplexer of claim 1, wherein the controller is configured to control the third optical phase shifter such that the value of the third relative phase shift varies within a finite range that depends on the value of the first relative phase shift.

7. The 2×2 optical MIMO demultiplexer of claim 6, wherein the controller is configured to control the third optical phase shifter such that the value of the third relative phase shift is between 0 and $+n\pi$, based on the value of the first relative phase shift being $c-\pi/2$, and such that the value of the third relative phase shift is between $-n\pi$ and 0, based on the value of the first relative phase shift being $c+\pi/2$, where n is an integer and where c is a real number.

8. The 2×2 optical MIMO demultiplexer of claim 6, wherein the controller is configured to control the third optical phase shifter in an analog manner such that the value of the third relative phase shift various continuously within a range $(0, +n\pi)$ or within a range $(-n\pi, 0)$.

9. The 2×2 optical MIMO demultiplexer of claim 1, wherein the controller comprises:

at least one processor; and at least one memory storing instructions that, based on being executed by the at least one processor, cause the at least one processor to control the first optical phase shifter, the second optical phase shifter, and the third optical phase shifter.

10. The 2×2 optical MIMO demultiplexer of claim 1, further comprising a first optical attenuator configured to apply a first relative attenuation between the first pair of optical transmission paths.

11. The 2×2 optical MIMO demultiplexer of claim 10, further comprising a second optical attenuator configured to apply a second relative attenuation between the third pair of optical transmission paths.

12. The 2×2 optical MIMO demultiplexer of claim 1, wherein each of the first optical phase shifter, the second optical phase shifter, and the third optical phase shifter have a phase shifting range that is less than or equal to $2\pi$.

13. An optical multi-input-multi-output (MIMO) receiver, comprising:

an input port configured to receive input light;

means for performing adaptive 2×2 optical MIMO polarization demultiplexing on the input light using 3-stage optical phase-shifting to output a first optical signal and a second optical signal, the means comprising a first optical phase shifter controlled to apply a first relative phase shift that varies in a discontinuous manner, a second optical phase shifter controlled to apply a second relative phase shift that varies in a continuous manner, and a third optical phase shifter controlled to apply a third relative phase shift that varies in a continuous manner; and at least one photodetector configured to detect the first optical signal and the second optical signal.

14. A method of performing 2×2 optical multi-input-multi-output (MIMO) demultiplexing, the method comprising:

receiving light through a pair of MIMO inputs into a first pair of optical transmission paths;

controlling a first optical phase shifter to apply a first relative phase shift between the first pair of optical transmission paths, the first relative phase shift varying in a discontinuous manner;

combining the first pair of optical transmission paths with a first 2×2 optical coupler to output a second pair of optical transmission paths;

controlling a second optical phase shifter to apply a second relative phase shift between the second pair of optical transmission paths, the second relative phase shift varying in a continuous manner;

combining the second pair of optical transmission paths with a second 2×2 optical coupler to output a third pair of optical transmission paths;

controlling a third optical phase shifter to apply a third relative phase shift between the third pair of optical transmission paths, the third relative phase shift varying in a continuous manner;

combining the third pair of optical transmission paths with a third 2×2 optical coupler to output a fourth pair of optical transmission paths; and outputting the fourth pair of optical transmission paths through a pair of MIMO outputs, which are output from the third 2×2 optical coupler, as a pair of demultiplexed output light signals.

15. The method of claim 14, wherein controlling the first optical phase shifter comprises applying a value of the first relative phase shift that various discontinuously between binary values.

16. The method of claim 15, wherein the value of the first relative phase shift is binary between $c+\pi/2$ and $c-\pi/2$, where c is a real number.

17. The method of claim 14, wherein controlling the second optical phase shifter comprises applying a value of the second relative phase shift that is continuous within a finite range that includes $-n\pi$ and $+n\pi$, where n is an integer.

18. The method of claim 17, wherein controlling the second optical phase shifter is performed by analog operation within a range $(-n\pi, +n\pi)$.

19. The method of claim 14, wherein controlling the third optical phase shifter comprises applying a value of the third relative phase shift that varies within a finite range that depends on a value of the first relative phase shift.

20. The method of claim 19, wherein controlling the third optical phase shifter further comprises:
controlling the third optical phase shifter to operate between 0 and $+n\pi$, based on the value of the first relative phase shift being $c-\pi/2$, and to operate between $-n\pi$ and 0, based on the value of the first relative phase shift being $c+\pi/2$, where n is an integer and where c is a real number.

21. The method of claim 19, wherein controlling the third optical phase shifter is performed by analog operation within a range $(0, +n\pi)$ or within a range $(-n\pi, 0)$, depending on the value of the first relative phase shift.

22. The method of claim 14, further comprising:
detecting a first reference signal on a first polarization channel in a first MIMO output of the pair of MIMO outputs,
detecting a second reference signal on a second polarization channel in a second MIMO output of the pair of MIMO outputs,
determining an amount of error in demultiplexing measured from the first reference signal and the second reference signal; and
controlling at least one of the first optical phase shifter, the second optical phase shifter, or the third optical phase shifter based on the amount of error measured from the first reference signal and the second reference signal.

23. The method of claim 14, wherein the 2×2 optical MIMO demultiplexing is performed in an endless manner without resetting any of the first optical phase shifter, the second optical phase shifter, or the third optical phase shifter during operation.

* * * * *